(12) United States Patent
Koppes et al.

(10) Patent No.: US 6,523,840 B1
(45) Date of Patent: Feb. 25, 2003

(54) COMBINED SHOPPING CART STROLLER

(75) Inventors: Dana J. Koppes, Columbus, OH (US); Eric J. Fickas, Powell, OH (US); Vincent A. Gioia, Westmont, IL (US); Rodger Hays, Columbus, OH (US); Joni Hill, Bartlett, IL (US); Paul P. Kolada, Bexley, OH (US); Thomas P. Martini, Gahanna, OH (US); Jon M. Provencher, Geneva, IL (US); Kevin J. Vititoe, Columbus, OH (US)

(73) Assignee: Ohio Steel Corporation, Columbus, OH (US)

(*) Notice: Subject to any disclaimer, the term of this patent is extended or adjusted under 35 U.S.C. 154(b) by 0 days.

(21) Appl. No.: 09/636,181

(22) Filed: Aug. 10, 2000

(51) Int. Cl.⁷ .................... B62B 11/00; B62B 7/00; B62B 1/00; B62D 39/00

(52) U.S. Cl. ................. 280/47.35; 280/47.38; 280/648; 280/33.991

(58) Field of Search ............... 280/648, 650, 280/651, 657, 658, 33.991, 33.992, 33.993, 33.997, 642, 647, 47.34, 47.35, 47.38, 47.4, 79.11, 79.2, 79.3, DIG. 3, DIG. 4; 297/243; D12/128, 129, 130

(56) References Cited

U.S. PATENT DOCUMENTS

| | | | |
|---|---|---|---|
| 951,553 A | 3/1910 | Williams et al. | |
| 1,563,152 A | 11/1925 | Bowen | |
| 2,429,034 A | 10/1947 | Smith et al. | 280/41 |
| D148,128 S | 12/1947 | Brottman | D14/3 |
| 2,443,236 A | 6/1948 | Gallagher | 280/50 |
| 2,450,062 A | 9/1948 | Voss et al. | 16/18 |
| 2,615,726 A | 10/1952 | Brottman | 280/47 |
| 2,683,480 A | 7/1954 | Kosman | 155/22 |
| 2,769,482 A | 11/1956 | Carlson | 155/10 |
| 3,048,420 A | 8/1962 | Umanoff | 280/62 |
| D196,836 S | 11/1963 | Berger | D14/3 |
| 3,486,185 A | 12/1969 | Lange | 16/18 |
| 3,497,234 A | 2/1970 | Schray | 280/33.99 |
| 3,612,603 A | 10/1971 | Snyder et al. | 297/130 |
| 3,726,536 A | 4/1973 | Ariño | 280/36 C |
| 3,774,929 A | 11/1973 | Stanley | 280/41 R |
| 3,885,806 A | * 5/1975 | Trubiano | 280/33.993 |
| 3,998,490 A | * 12/1976 | Lallave | 297/243 |
| 4,403,807 A | 9/1983 | Wilkinson et al. | 297/217 |
| 4,555,123 A | 11/1985 | Rehrig | 280/160 |
| 4,560,096 A | 12/1985 | Lucas et al. | 224/42.42 |
| 4,583,758 A | 4/1986 | Runion et al. | 280/644 |
| 4,598,945 A | 7/1986 | Hopkins | 280/250 |
| 4,685,688 A | 8/1987 | Edwards | 280/30 |
| 4,763,919 A | 8/1988 | Nakao et al. | 280/644 |
| 4,765,644 A | 8/1988 | Bell | 280/641 |
| 4,861,105 A | 8/1989 | Merten et al. | 297/250 |
| 4,877,289 A | 10/1989 | Herrera | 297/250 |
| 4,923,208 A | 5/1990 | Takahashi et al. | 280/642 |
| 4,953,887 A | 9/1990 | Takahashi et al. | 280/647 |
| 4,958,887 A | 9/1990 | Meeker | 297/250 |
| 4,984,813 A | 1/1991 | Takahashi et al. | 280/30 |
| 5,018,754 A | 5/1991 | Cheng | 280/47.4 |
| D318,550 S | 7/1991 | Stefano | D34/21 |
| 5,125,674 A | 6/1992 | Manuszak | 280/30 |
| 5,203,578 A | 4/1993 | Davidson et al. | 280/33.991 |

(List continued on next page.)

Primary Examiner—Brian L. Johnson
Assistant Examiner—Gerald Klebe
(74) Attorney, Agent, or Firm—Michael Best & Friedrich LLP

(57) ABSTRACT

A combined shopping cart stroller having cargo carrying and passenger carrying capabilities is provided. The shopping cart stroller comprises a frame supported on wheels for rolling movement, a seat mounted to the frame and being shiftable between an unfolded position in which the seat is positioned to support the passenger and a folded position in which the folded seat defines a portion of a forward cargo area, a rearward cargo area defined by a rearward portion of the frame, and a lower cargo area defined by a lower portion of the frame.

10 Claims, 27 Drawing Sheets

U.S. PATENT DOCUMENTS

| | | | |
|---|---|---|---|
| 5,238,293 A | 8/1993 | Gibson | 297/229 |
| 5,263,726 A | 11/1993 | Wood | 280/33.992 |
| 5,277,473 A | 1/1994 | Kelly et al. | 297/250.1 |
| 5,290,049 A | 3/1994 | Crisp et al. | 280/30 |
| 5,354,079 A | 10/1994 | Hettenbach | 280/33.991 |
| 5,417,449 A | 5/1995 | Shamie | 280/642 |
| D360,392 S | 7/1995 | Lewandowski | D12/129 |
| D363,589 S | 10/1995 | Lafleur et al. | D34/21 |
| D366,546 S | 1/1996 | Schaub et al. | D34/20 |
| 5,494,308 A | 2/1996 | Southerland | 280/33.992 |
| 5,531,238 A | 7/1996 | Azzarelli et al. | 135/66 |
| 5,544,904 A | 8/1996 | Maher | 280/47.35 |
| 5,553,876 A | 9/1996 | Trubiano | 280/33.991 |
| 5,553,877 A | 9/1996 | Huang | 280/33.997 |
| D377,255 S | 1/1997 | Rehrig | D34/27 |
| 5,595,394 A | 1/1997 | Adamson | 280/33.993 |
| D386,873 S | 11/1997 | Langlois D'Estaintot et al. | D34/21 |
| 5,715,571 A | 2/1998 | Fasano | 16/110 R |
| 5,722,594 A | 3/1998 | Farr et al. | 280/643 |
| 5,820,142 A | 10/1998 | Duer | 280/33.992 |
| 5,887,888 A | 3/1999 | Tseng | 280/644 |
| 5,938,091 A | 8/1999 | Bergin et al. | 224/411 |
| 5,961,018 A | 10/1999 | Abelbeck et al. | 224/584 |
| 5,961,133 A | 10/1999 | Perry | 280/33.993 |
| 5,988,670 A | 11/1999 | Song et al. | 280/648 |
| 6,003,894 A | 12/1999 | Maher | 280/639 |
| 6,086,087 A * | 7/2000 | Yang | 280/658 |
| 6,099,022 A * | 8/2000 | Pring | 280/648 |

* cited by examiner

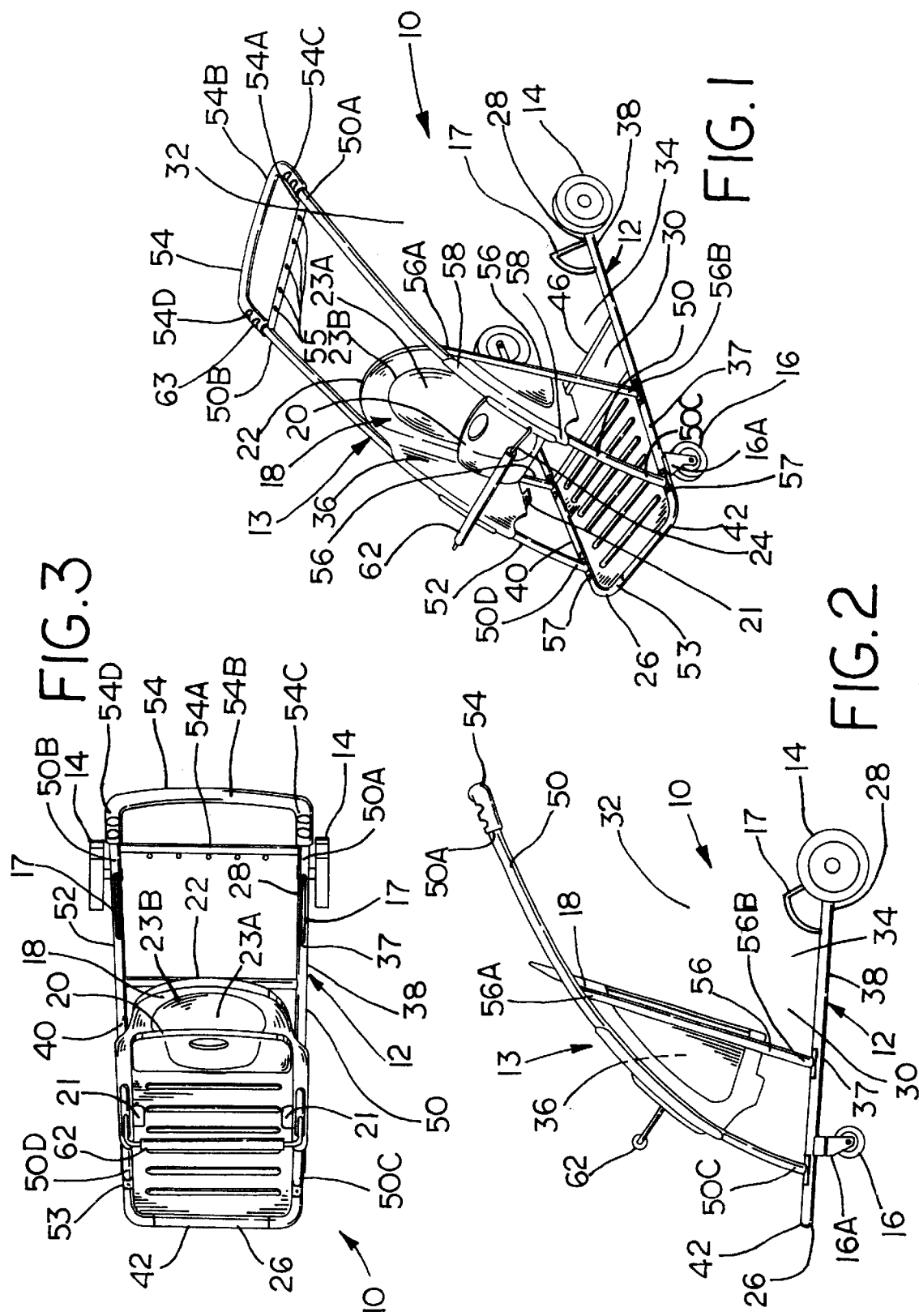

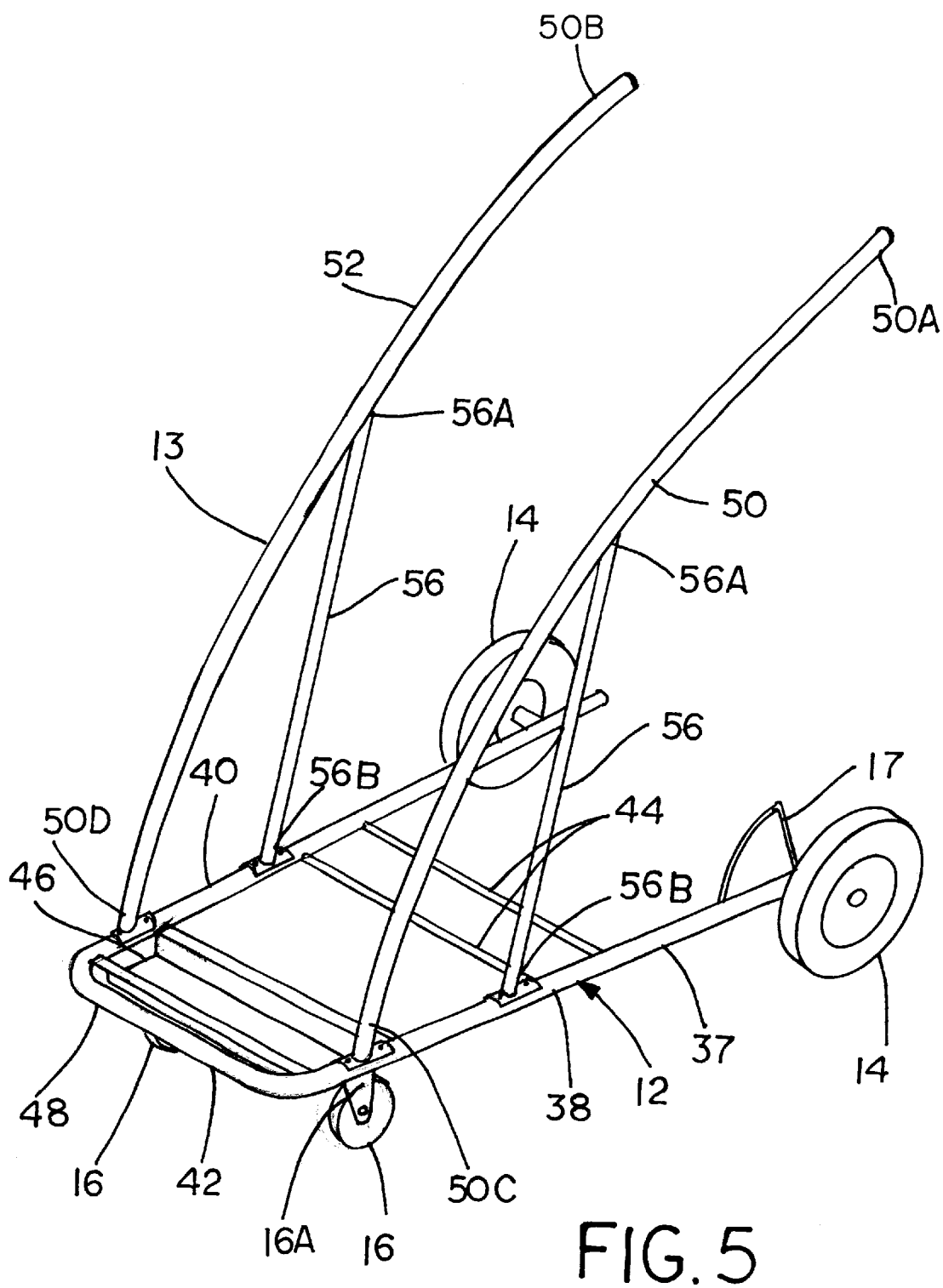

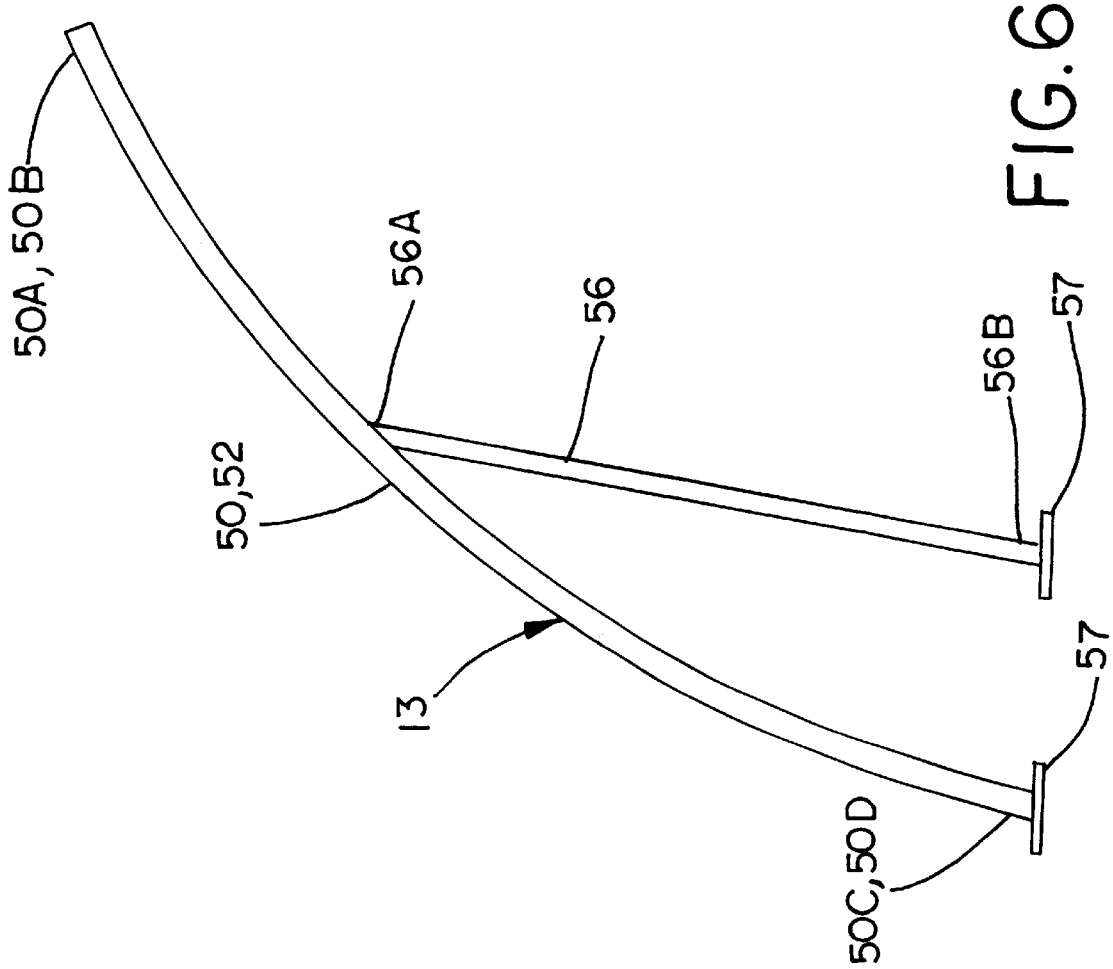

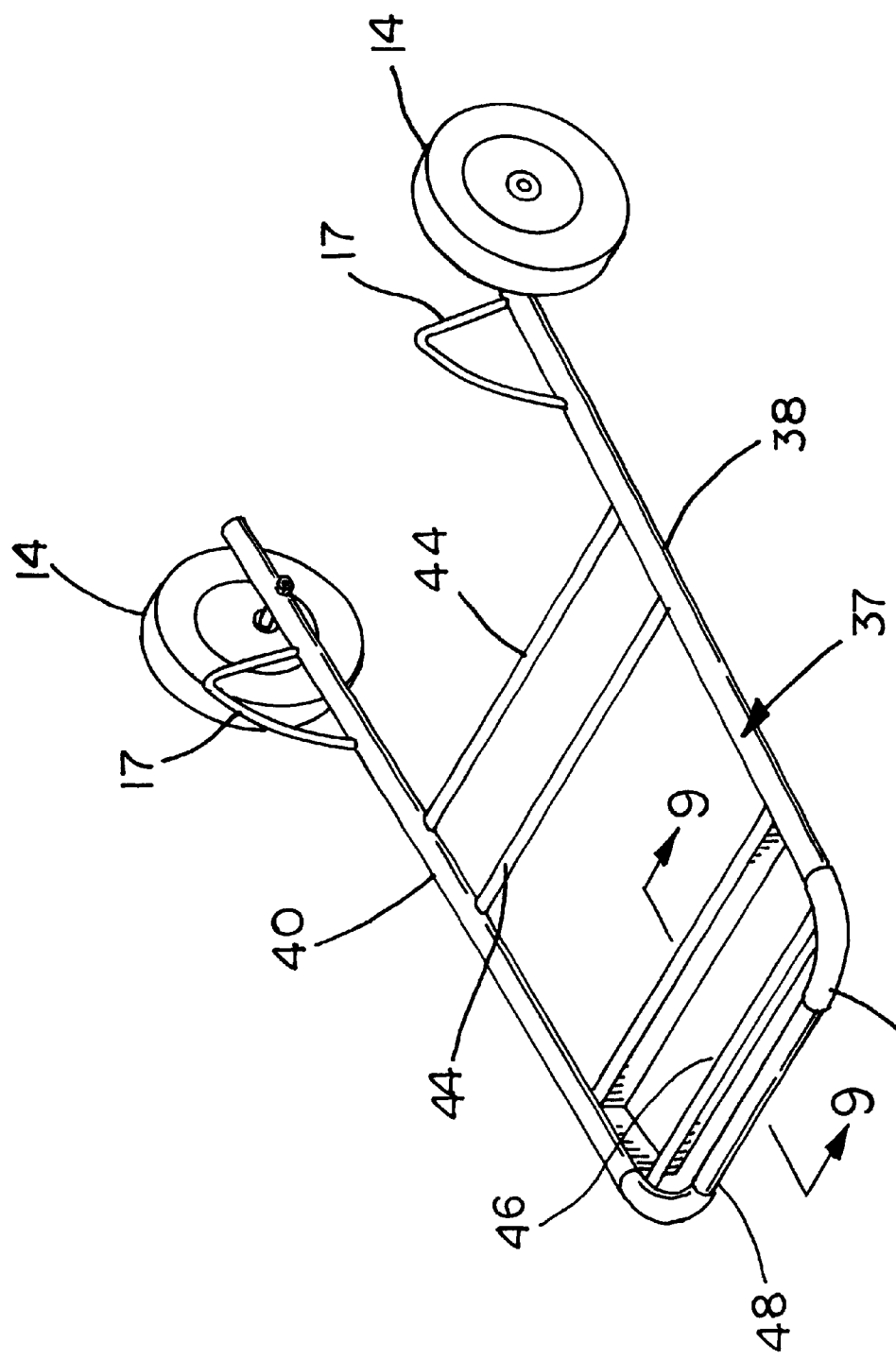

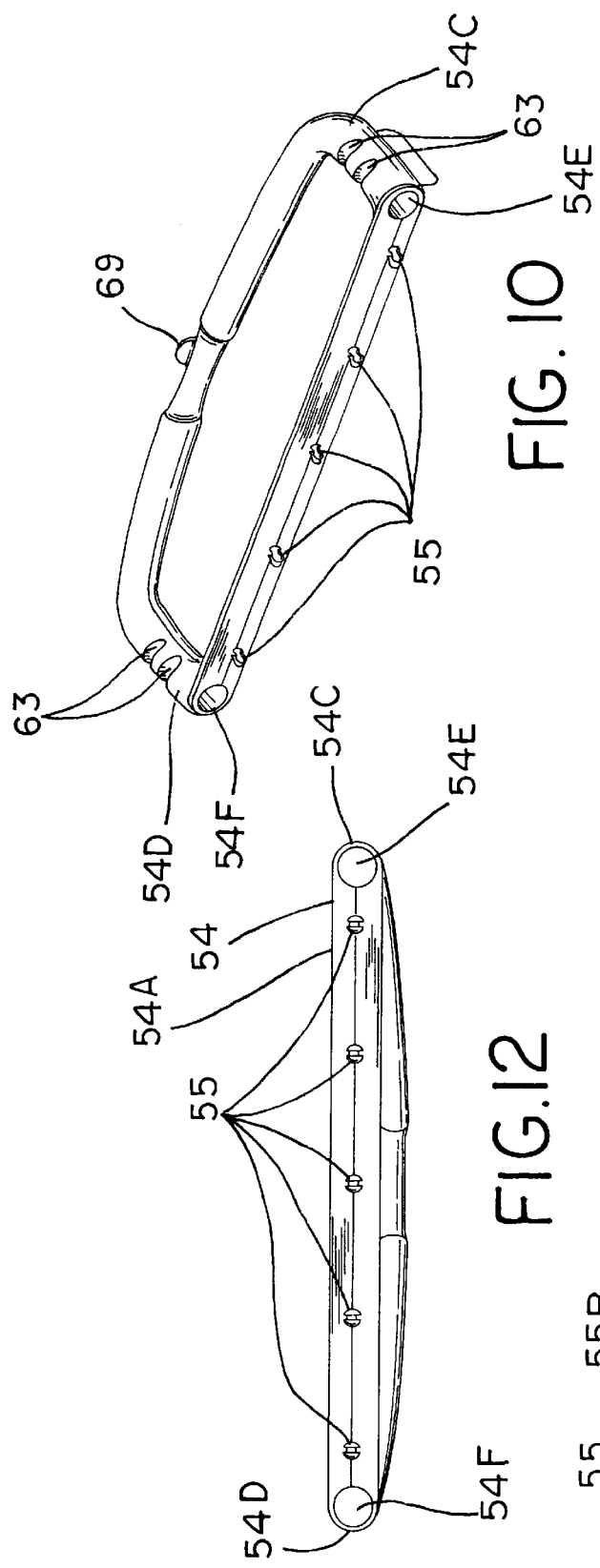
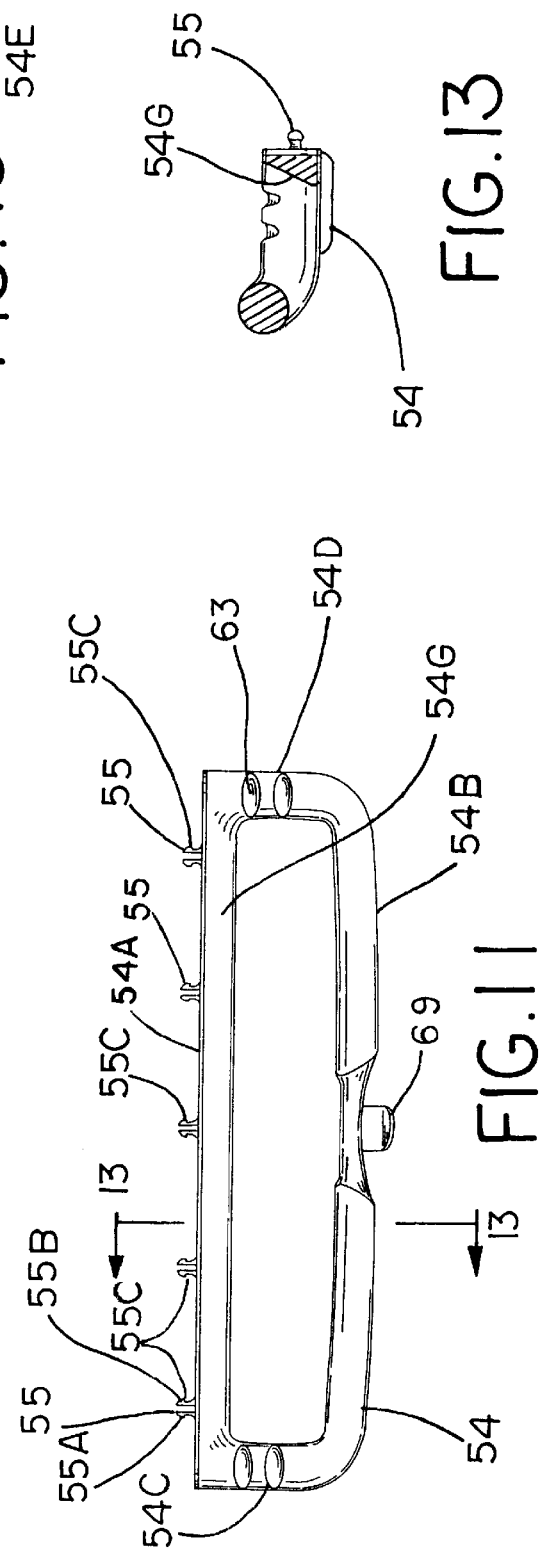

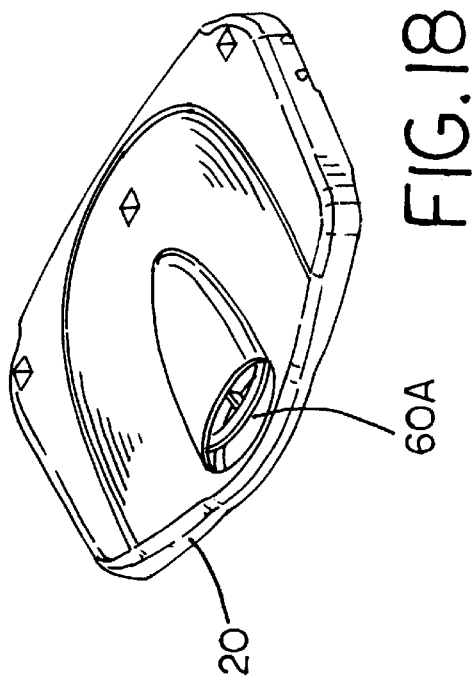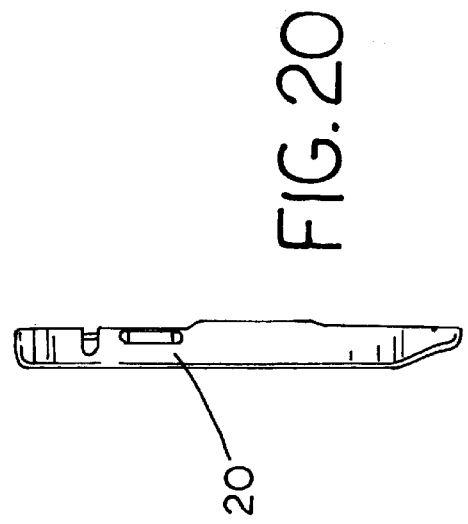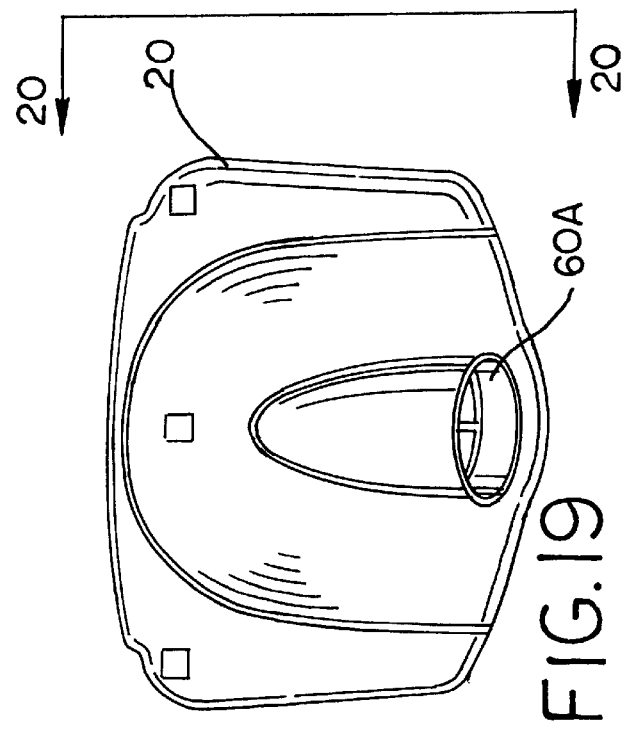

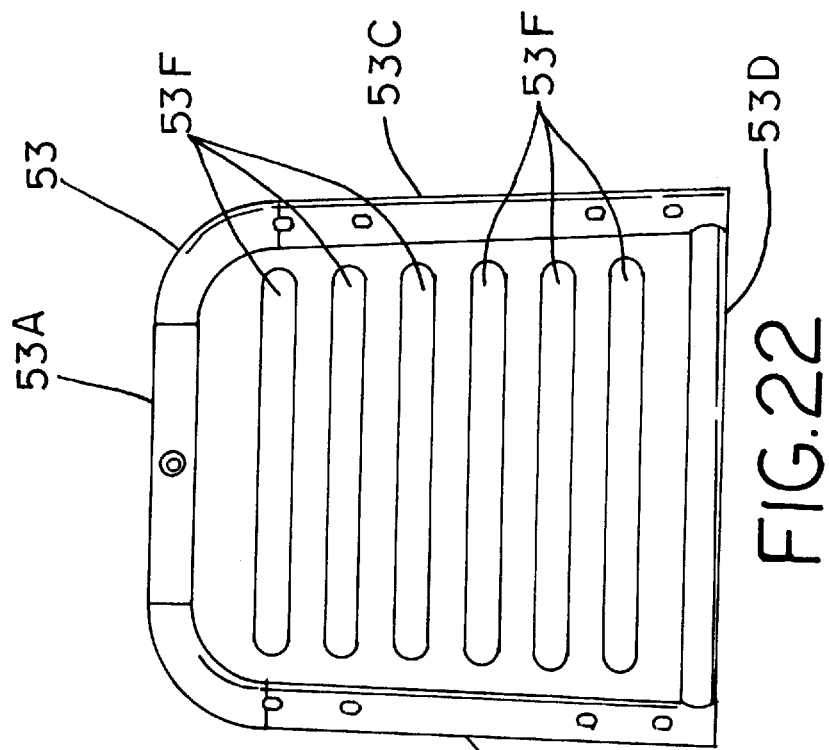
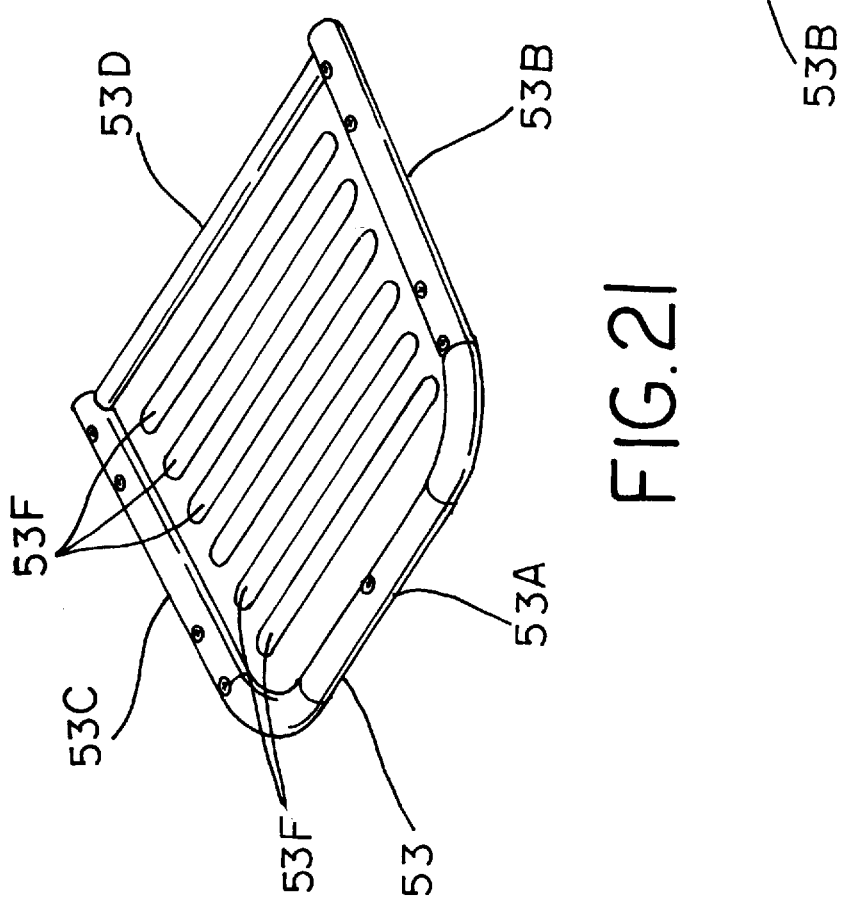

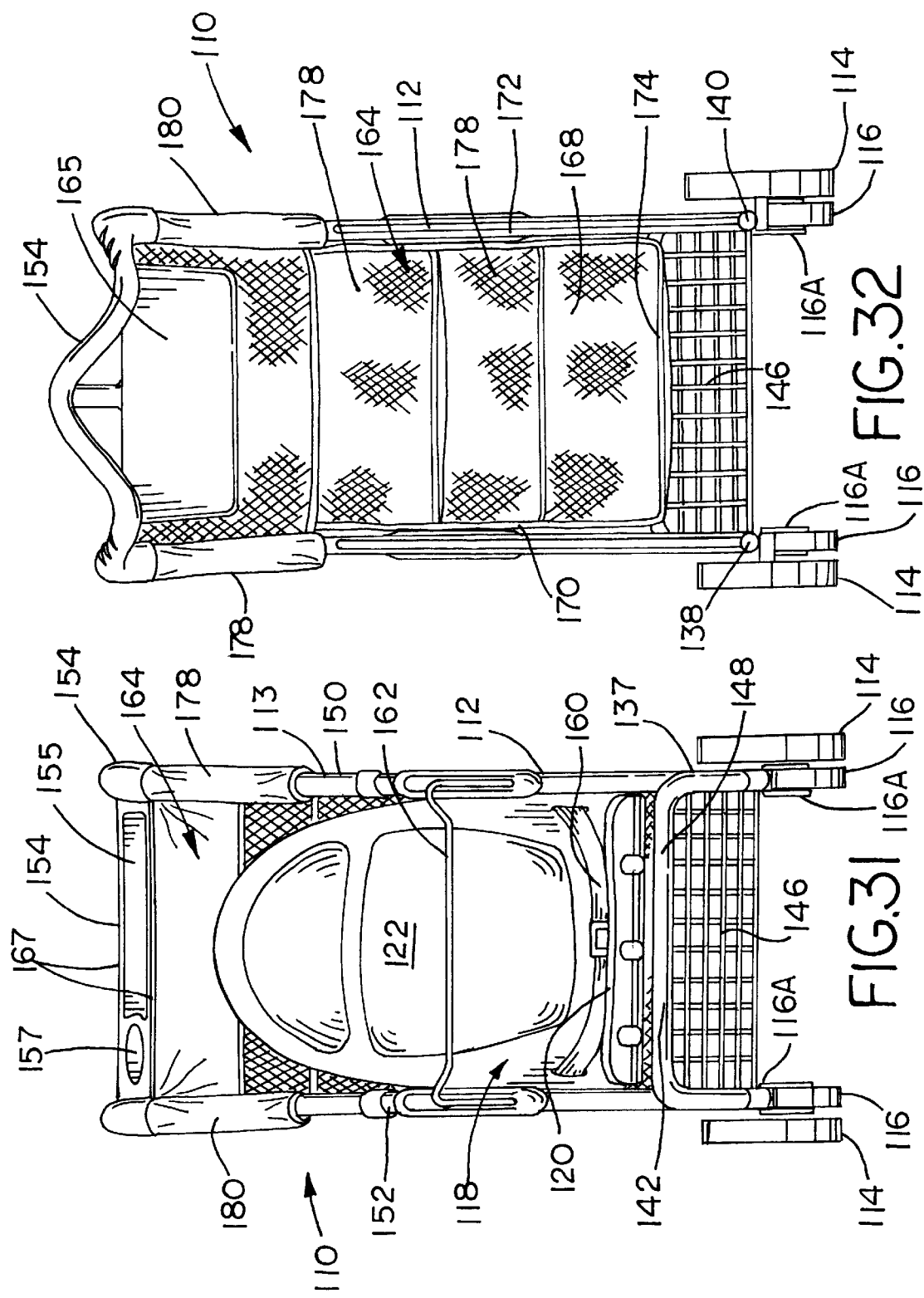

COMBINED SHOPPING CART STROLLER

FIELD OF THE INVENTION

The present invention relates to a shopping cart that can also function as a stroller, child seat carrier, or the like. More specifically, the present invention relates generally to a combined shopping cart stroller. The combined shopping cart stroller can have a number of cargo carrying and passenger carrying configurations.

BACKGROUND OF THE INVENTION

Shopping carts and strollers both enjoy widespread use in retail environments and elsewhere. On a typical shopping cart, a cargo carrying area is defined by a rigid frame in the forward portion of the cart. A usually collapsible rearwardly facing child seat is commonly provided in a rear portion of the frame. On existing shopping carts, the child seat is often sized to accommodate only small children within a certain very limited size range, and thus such existing shopping carts may not be well suited to carry larger children and/or infants. Moreover, existing shopping carts are not well suited for carrying certain types of cargo, such as, by way of example, large packages and products or clothing on hangers. Further, existing shopping carts tend to carry all of the cargo in a single area, with no means for separately transporting dissimilar goods or goods of different size and shape. On the other hand, existing child carriers, strollers, or infant seats are designed specifically for carrying children and usually have no capacity for safely receiving and transporting cargo.

Accordingly, there exists a need for a device that safely and effectively combines one or more of the functions of a shopping cart with one or more of the functions of a child carrier, stroller, or infant seat.

SUMMARY OF THE INVENTION

In accordance with an important aspect of the invention, a combined shopping cart stroller having cargo carrying and passenger carrying capabilities comprises a frame supported on wheels for rolling movement. The frame includes an at least primarily horizontal lower frame portion having a forward end and a rearward end, and a curved upper frame portion extending from a point at or near the forward end of the lower frame portion to a point spaced above the rearward end of the lower frame portion. It also includes a generally vertical support extending between the lower frame portion and the upper frame portion. The generally vertical support extends from a point generally intermediate the forward and rearward ends of the lower frame portion to a corresponding point of the upper frame portion generally above the lower frame portion. A seat is mounted to the frame to provide a seating area for a passenger generally forward of the vertical support, and a primary cargo area is defined in the space generally bounded by the lower frame portion and the upper frame portion rearwardly of the seating area.

In further accordance with a preferred aspect of the invention, the seat includes a pair of side panels, which seat side panels are disposed between the generally vertical supports and the upper frame portion forward of the generally vertical support in order to provide an enclosed seating area to protect a passenger seated therein. The primary cargo area may include a cargo bag supported by the curved upper frame portion rearwardly of the generally vertical support and rearwardly of the seating area. Preferably, a handle is disposed at a rearwardmost end of the curved upper frame portion which is generally vertically above a rearward end of the lower frame portion, and the primary cargo area includes a cargo bag supported on the curved upper frame portion between the generally vertical support and the handle.

The lower and the upper frame portions may each include a pair of rails in spaced relation, with the frame further including a pair of generally vertical supports between the respective rails of the lower and the upper frame portions. At least a pair of cross supports between the rails of the lower frame portion are provided to maintain spacing between the rails and to define a secondary cargo area. A floor area may be included at the forward end of the lower frame portion for providing a footrest for a passenger in the seating area and also providing an additional cargo carrying area.

The seat defines a tertiary cargo area, with the seat being foldable to expand the tertiary cargo area such that it extends to the floor. The spaced rails of the lower frame portion may also be tapered inwardly from the rearward end to the forward end. The cross supports are suitably spaced forwardly of the rearward ends of the lower frame portion to accommodate nesting.

In accordance with another aspect of the invention, a combined shopping cart stroller having cargo carrying and passenger carrying capabilities comprises a frame supported on wheels for rolling movement, a seat mounted to the frame, wherein the seat is shiftable between an unfolded position in which the seat is positioned to support the passenger and a folded position in which the folded seat defines at least a portion of a forward cargo area, a rearward cargo area defined by a rearward portion of the frame, and a lower cargo area defined by a lower portion of the frame.

In further accordance with this aspect of the invention, the rearward cargo area may include a flexible cargo bag. Preferably, the cargo bag may include a plurality of pockets. Further, a rearward portion of the frame may include a handle, and the handle may include at least a storage bin. The storage bin may comprise a cup holder alone or in combination with still another storage bin. Additionally, a portion of the handle may be adapted to support and maintain a garment hanger in a secure location on the handle.

The frame may be adapted to support an infant seat within the seat which is mounted to the frame, and may also include a cross bar spaced forwardly thereof to define a restraint bar. The cross bar may serve dual functions as a restraint bar by either restraining a passenger in the frame-mounted seat or, alternatively, maintaining an infant seat in a secure position within the frame-mounted seat. Ideally, the front and rear ends of the cart will be shaped and/or sized so that the shopping cart strollers can be stored in a nested arrangement.

The seat may include a slot or slots, or may otherwise be adapted so that the seat can support a placard. The placard can suitably contain informational material, such as, for example, advertising material. Preferably, the seat will include a seat belt, and the cross bar may include protective padding.

In accordance with yet another aspect of the invention, a combined shopping cart stroller comprises a frame supported on a plurality of wheels for rolling movement, with the frame defining a passenger area and a plurality of cargo areas. A seat is mounted to the passenger area of the frame, with the seat being shiftable between an unfolded position in which the seat is positioned to support a passenger and a folded position. The plurality of cargo areas include a first cargo area defined behind the seating area, a second cargo area defined below the seating area, and a third cargo area defined in part by the seat when the seat is in the folded position.

In accordance with still another aspect of the invention, a combined shopping cart stroller comprises a frame supported on a plurality of wheels, a seat mounted to the frame which is shiftable between a passenger carrying position in which the seat is positioned to support a passenger and a non-passenger carrying position, a first cargo area defined generally adjacent a rearward portion of the frame, a second cargo area defined adjacent a lower portion of the frame, and a third cargo area defined by the seat which is expandable upon folding the seat to the non-passenger carrying position.

Other objects, features and advantages are inherent in the apparatus claimed and disclosed or will become apparent to those skilled in the art from the following detailed description and its accompanying drawings.

BRIEF DESCRIPTION OF THE DRAWINGS

FIG. 1 is a perspective view of a combined shopping cart stroller assembled in accordance with the teachings of a first preferred embodiment of the present invention and which is adapted to receive a flexible net cargo bag illustrated in FIG. 4;

FIG. 2 is a side elevational view of the shopping cart illustrated in FIG. 1;

FIG. 3 is a top plan view thereof;

FIG. 5 is an enlarged fragmentary view in perspective of the shopping cart of FIGS. 1–3 which illustrates the construction of the frame in greater detail;

FIG. 6 is an enlarged fragmentary view illustrating the upper portion of the frame in greater detail;

FIG. 8 is a fragmentary view in perspective of the lower portion of the frame;

FIG. 10 is a fragmentary view in perspective of the handle unit;

FIG. 11 is a top plan view of the handle unit illustrated in FIG. 10;

FIG. 12 is a front side elevational view thereof;

FIG. 13 is a cross-sectional view taken along line 13—13 of FIG. 11;

FIG. 18 is an enlarged view in perspective of a seat bottom;

FIG. 19 is a top plan view of the seat bottom illustrated in FIG. 18;

FIG. 20 is a side elevational view taken along line 20—20 of FIG. 19;

FIG. 21 is a perspective view of a deck platform for attachment to the frame;

FIG. 22 is a top plan view thereof;

FIG. 31 is a front elevational view of the shopping cart illustrated in FIGS. 27 through 30;

FIG. 32 is a rear elevational view thereof;

DESCRIPTION OF THE PREFERRED EMBODIMENTS

Figure 4:
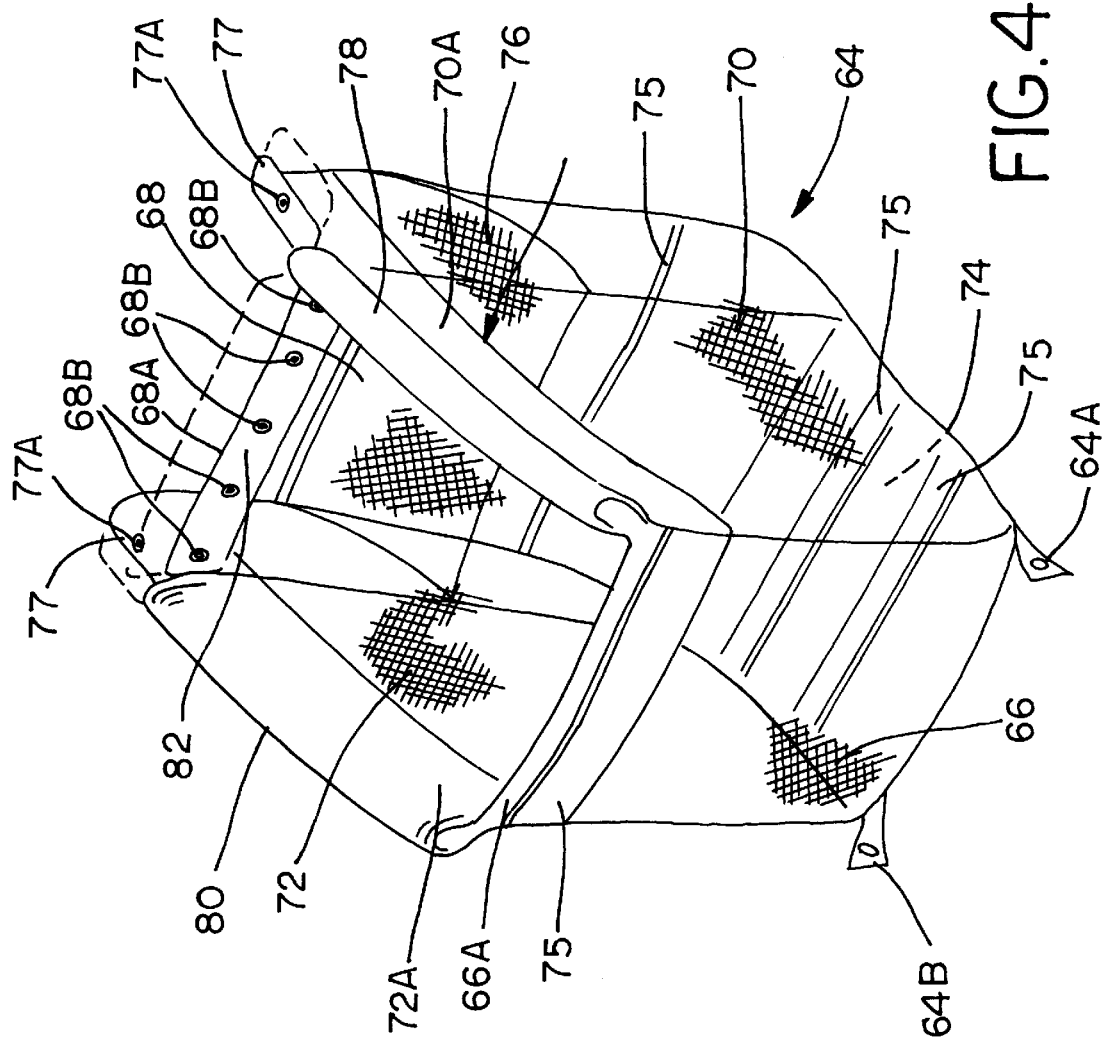
FIG. 4 is a perspective view of the flexible cargo bag adapted for attachment to the shopping cart illustrated in FIGS. 1 through 3.
Figure 7D:
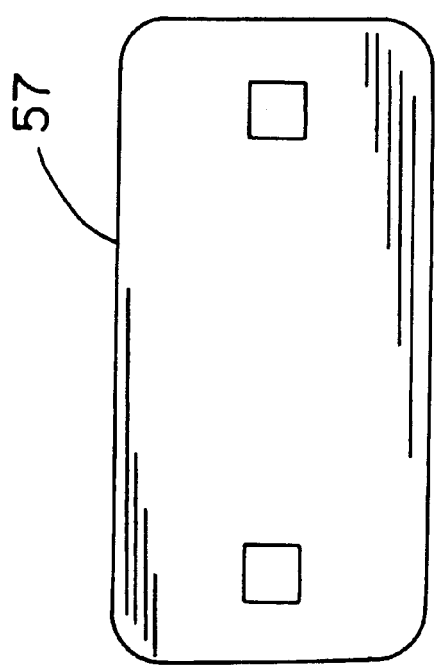
FIGS. 7A through 7D are enlarged views of connector plates for use at the interface between the upper portion of the frame and the lower portion of the frame.
Figure 7C:
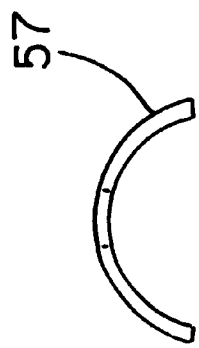
Figure 7B:
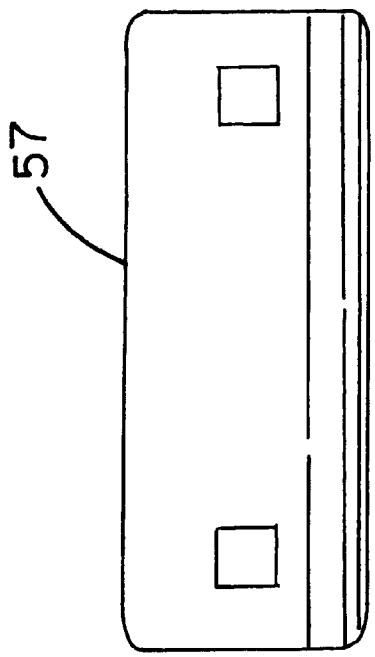
Figure 7A:
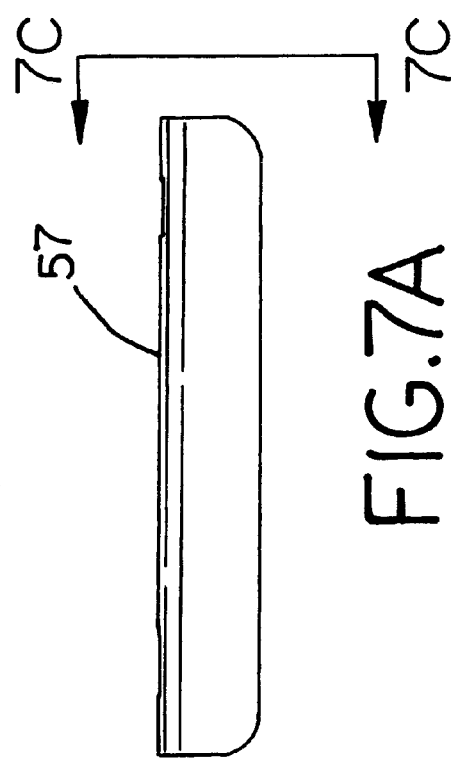

The following description of the preferred embodiment or embodiments is not intended to limit the scope of the invention to the precise form or forms disclosed, but instead is intended to be illustrative of the principles of the invention so that others skilled in the art may follow its teachings.

Referring now to FIGS. 1–8 of the drawings, a combined shopping cart stroller assembled in accordance with the teachings of a first preferred embodiment of the present invention is generally referred to by the reference numeral 10. The shopping cart 10 includes a frame 12 supported on a pair of rear wheels 14 and a pair of front wheels 16, with each of the front wheels 16 being mounted on a caster 16a. In accordance with the embodiment shown, the configuration is a four-wheeled configuration.

Alternatively, the shopping cart 10 may have a three-wheeled configuration. The frame may be constructed of tubular aluminum or steel, or any other suitable material such as plastic as long as strength and durability considerations are satisfied. In accordance with the illustrated embodiment, one or more wheel guards 17 may be provided generally adjacent the rear wheels 16 as shown in FIGS. 1–3, 5 and 8. Preferably, the wheel guards 17 may be formed from a bent tube or a bent rod, which may be welded to the frame or inserted in corresponding apertures (not shown) in the frame or partially welded and partially inserted into the frame 12.

As shown in FIG. 1, a seat, generally indicated at 18, is mounted to the frame 12 and includes a seat bottom 20 and a generally upright seat back 22. The seat bottom 20 is mounted to a seat rod or a pivot rod 24 (visible in FIG. 1) such that the seat bottom 20 can pivot or otherwise shift through a full range of motion between two distinct positions. In particular, the seat bottom 20 may be positioned in a generally horizontal, unfolded position, in which the seat bottom 20 is positioned to support a passenger (such as in a manner similar to that shown in FIG. 27 and described below with respect to a second preferred embodiment), and a generally upright, folded position as shown in FIG. 1. When in the unfolded position, the seat bottom 20 may be supported on a pair of tabs 21. Additionally, the seat bottom 20 may support a package or other item when the seat 18 is not occupied.

The shopping cart 10 includes a front end 26, a rear end 28, and a lower area 30. A first cargo area 32 is defined generally adjacent the rear end 28 of the shopping cart 10 (viewing FIG. 1, the first cargo area 32 may be created by securing a flexible net cargo bag 64, illustrated in FIG. 4, to the frame 12 in a manner to be discussed in greater detail below). A second cargo area 34 is defined generally adjacent the lower area 30. A third cargo area 36 is defined generally in the area normally occupied by the seat bottom 20. The third cargo area 36 can be enlarged upon folding the seat bottom 20 to the folded position as shown in FIG. 1.

Figure 9:
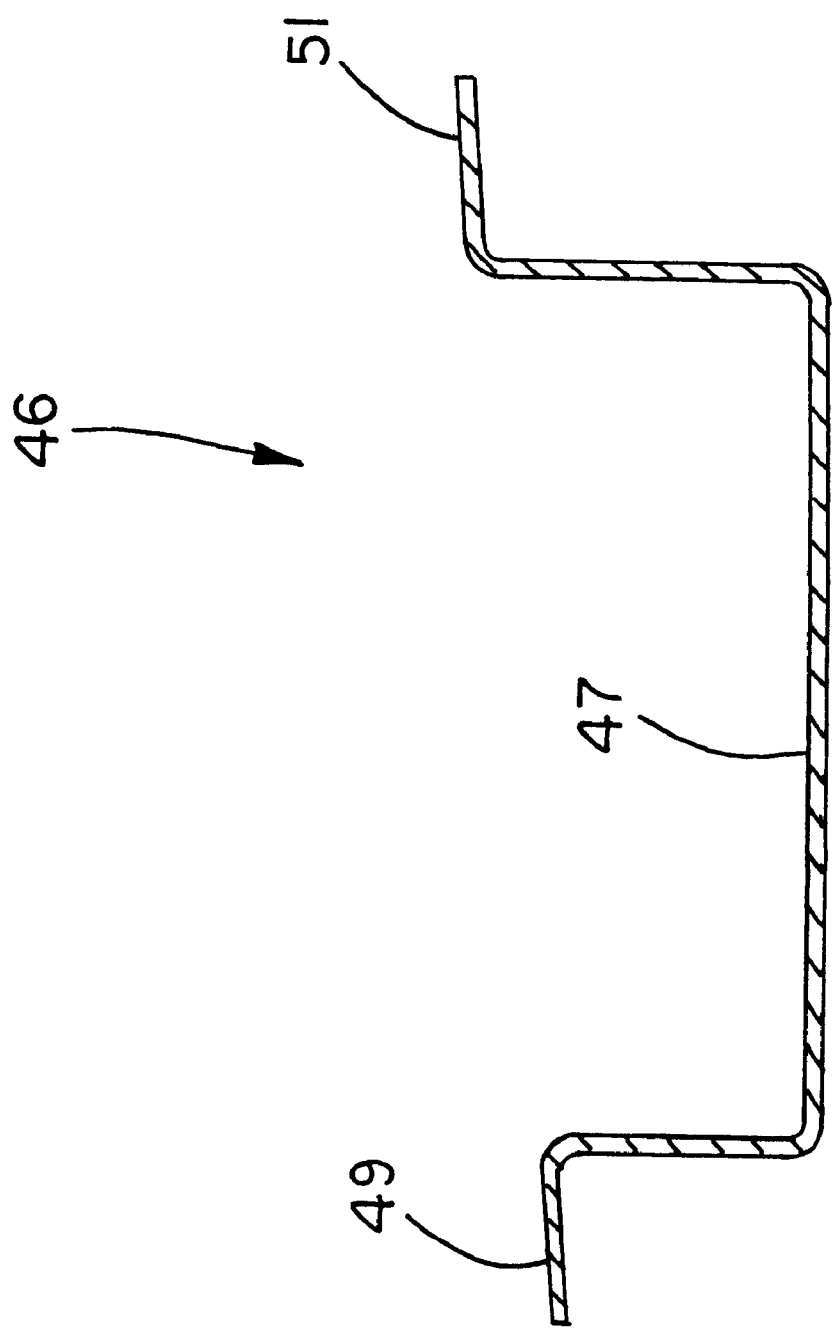
FIG. 9 is an enlarged cross-sectional view taken along line 9—9 of FIG. 8.
Figure 14:
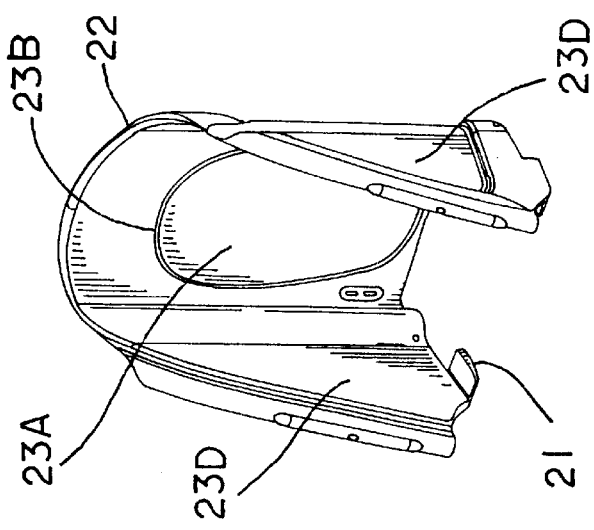
FIG. 14 is an enlarged fragmentary view in perspective of a portion of the seat unit and illustrating the seat back.
Figure 15:
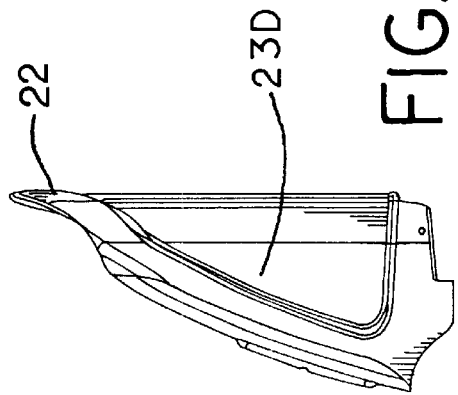
FIG. 15 is a side elevational view of the portion of the seating unit illustrated in FIG. 14.
Figure 17:
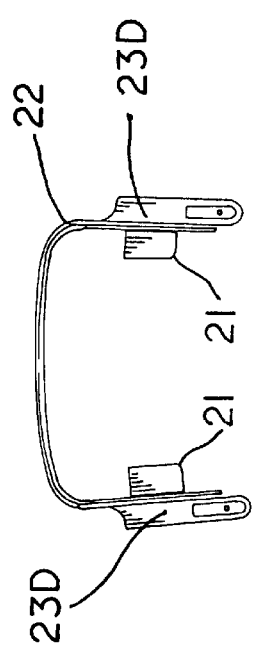
FIG. 17 is a top plan view of the seat back illustrated in FIGS. 14 through 16.
Figure 16:
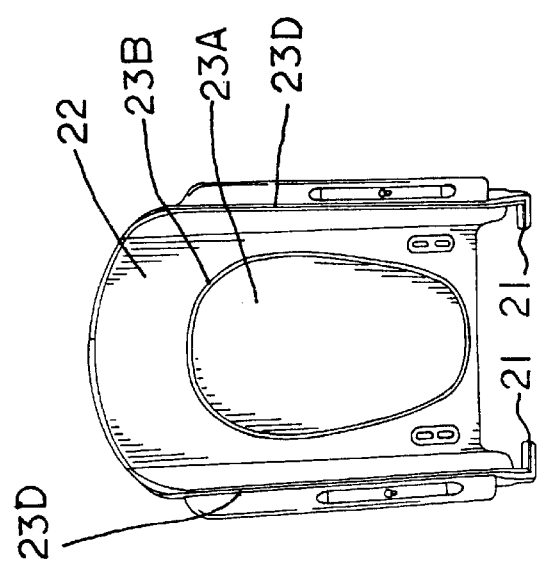
FIG. 16 is a front side elevational view of the seat back illustrated in FIGS. 14 and 15.

As shown in FIGS, 1–3 and 5–9, the frame 12 includes a generally U-shaped lower section 37 having a pair of lower rails 38, 40 which are connected by a front cross bar 42. One or more intermediate cross bars 44 may be provided. A front caster support 46 extends between the lower rails 38, 40 in a position to support the casters 16a for the front wheels 16 in a known manner. As shown in FIGS. 8 and 9, the caster support 46 includes a generally U-shaped portion 47 and a pair of flanges 49, 51. The caster support 46 may be formed from a flat pattern plate. Other suitable structures for the caster support 46 may be substituted. Further, the casters 16a may be connected directly to a portion of the lower section 37 of the frame 12. It will be appreciated that the cross bar 42 may also act as a footrest 48.

As shown in FIGS. 1, 3 and 21–22, a bolt-in deck unit 53 may be provided. The deck unit 53 may be constructed of any suitable material, such as polypropylene, and includes four sides 53a through 53d. Preferably, the sides 53a through 53c will be curved or otherwise shaped to correspond to the shape of the underlying portions of the lower section 37 of the frame 12, namely, the lower rails 38, 40 and the cross bar 42. The deck unit 53 will preferably include a series of indentations 53f. Alternatively, the deck unit 53 may be a solid or perforated platform or a wire grate, although it may be formed of webbing or a plurality of flexible straps or any other suitable construction.

Referring again to FIGS. 1–3 and 5–6, the frame 12 also includes an upper frame 13 which includes pair of sloping rails 50, 52, each of which may be constructed as shown in FIG. 6. As shown in FIGS. 1, 2, 5 and 6, the sloping rails 50, 52 extend generally rearwardly and upwardly to a handle 54 (FIGS. 1 and 2). The handle 54 may include a pair of apertures 54e and 54f (FIGS. 10 and 12), which are sized to receive ends 50a, 50b, of the sloping rails 50, 52. Alternatively, the ends 50a, 50b of the sloping rails 50, 52 may be attached to handle 54 using any suitable fasteners. In yet another manner, a portion of the handle 54 may be integrally formed with the sloping rails 50, 52 of the frame 12. One or more generally vertical uprights or intermediate supports 56 may be provided between the sloping rails 50, 52 and the lower rails 38, 40 of the lower section 37. The uprights 56 include upper ends 56a and lower ends 56b.

As shown in FIG. 6, the sloping rails 50, 52 include lower ends 50c, 50d, and, as shown in FIGS. 1, 2, and 5–7, the lower ends 50c, 50d each may have attached thereto a connector plate 57, which connector plate 57 is shown in greater detail in FIGS. 7A through 7D. A connector plate may also be provided at the lower ends 56b of the uprights 56. The connector plate 57 may be welded to the respective lower ends 50c, 50d of the sloping rails 50, 52 and the lower ends 56b of the uprights 56, and may further be shaped to correspond to the curvature of the underlying edge 53a–53c of the deck 53 at the point of connection. Similarly, additional connector plates 57 may be provided beneath the lower frame rails 38, 40 at the point of connection. The deck unit 53 is thus clamped in place between the connector plates 57 and the underlying lower frame rails 38, 40. The forward edge 53b of the deck 53 may also be secured, such as by self-tapping screws or other suitable fasteners (not shown) to the front rail 42 of the lower frame 37. As such, the upper frame 13 of FIG. 6 may be bolted or otherwise secured to the lower frame 37 of FIG. 8 in order to form the frame 12.

Figure 26:
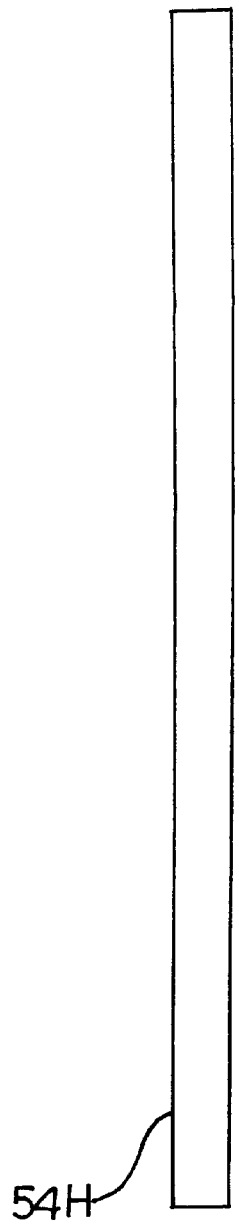
FIG. 26 is a front elevational view of an informational placard (shown blank) for use with the handle.

In accordance with a preferred embodiment of the invention, the handle 54 includes a pair of cross bars 54a and 54b, with the cross bar 54b being shaped for grasping by a user (not shown). A plurality of snaps 55 are provided on the cross bar 54a, thus providing for the attachment of the cargo bag 64 (shown in FIG. 4 and discussed in greater detail below). As shown in FIGS. 10–13, the handle 54 includes a pair of legs 54c and 54d, which interconnect the cross bars 54a and 54b. The legs 54c and 54d may be provided with one or more indentations or notches 63 which are sized to receive therein a hanger such as a garment hanger (not shown) of the type commonly encountered in a retail establishment. Additionally, a rearwardly facing hook 69 may be provided on the cross bar 54b. Finally, the cross bar 54a may be provided with a flat area 54g which is sized to receive an informational placard 54h (illustrated in FIG. 26).

Figure 30:
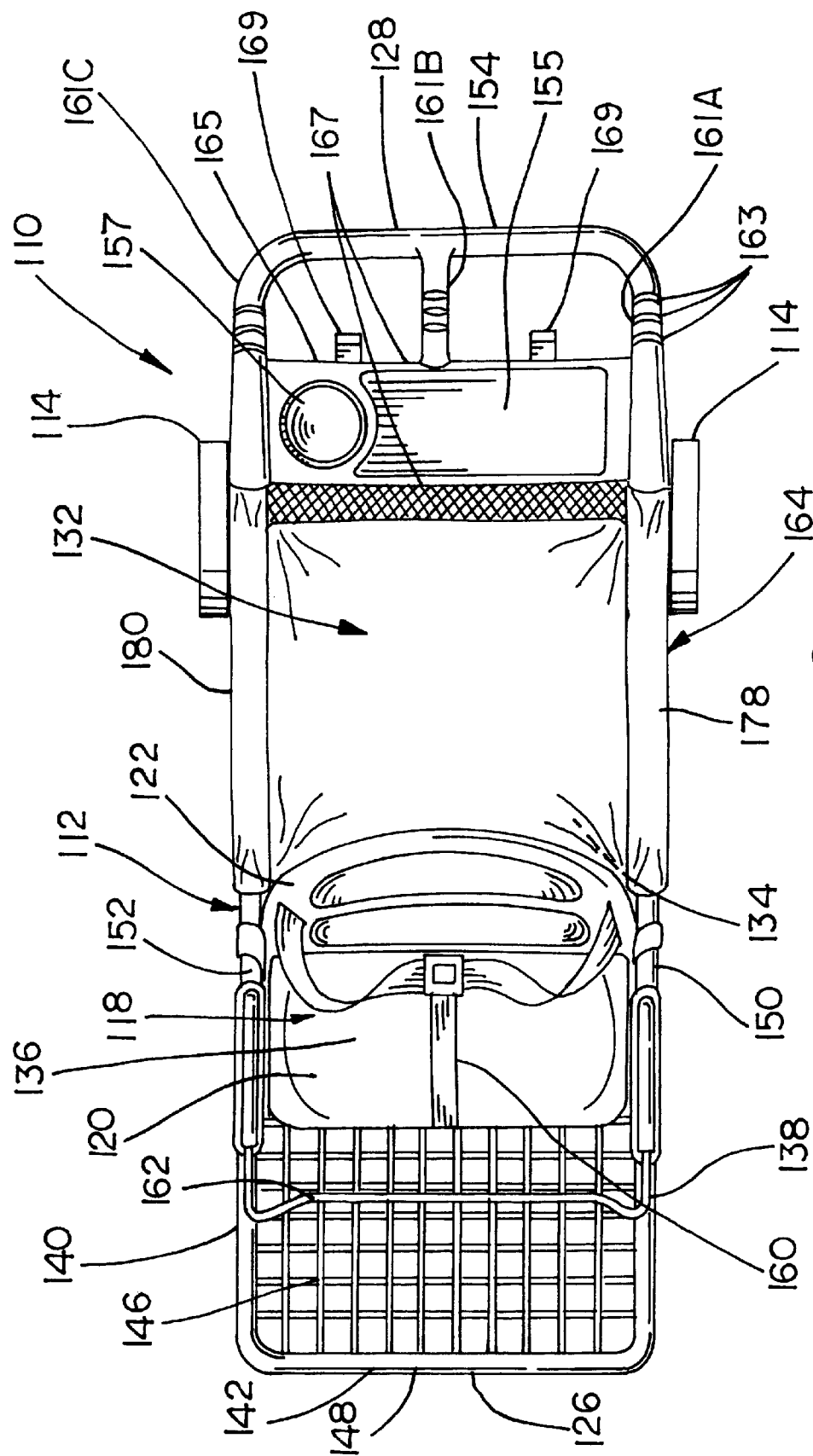
FIG. 30 is a top plan view of the shopping cart illustrated in FIGS. 27 through 29.

In further accordance with a preferred embodiment of the invention, it will be noted that the seat 18 may be a separate unit which is bolted, riveted, or otherwise suitably secured to the sloping rails 50, 52 of the frame 12, such as by a plurality of fasteners 58. Preferably, the components of the seat 18 (i.e., the seat bottom 20 and the seat back 22) each may be formed as a molded unit, such as from ABS plastic, polypropylene, or any other suitable material. The seat 18 is preferably provided with a seatbelt (not shown, but which may be a seatbelt similar to the seatbelt 160 illustrated in FIGS. 27 and 30 with respect to the second embodiment). The seatbelt is preferably of the "T" strap design known in the art. One or more apertures and/or handles 60a may be provided in the seat platform 20 as required. Further, a restraint bar 62 may be provided which extends across the front of the seat generally between the sloping rails 50, 52 as shown in FIGS. 1–3. All or a portion of the restraint bar 62 may be covered or otherwise encapsulated in a resilient padding material (FIGS. 23 and 24), such as foam padding or other materials that would be known to those of skill in the art, and the restraint bar 62 may perform an additional function as will be explained in greater detail below.

Figure 25:
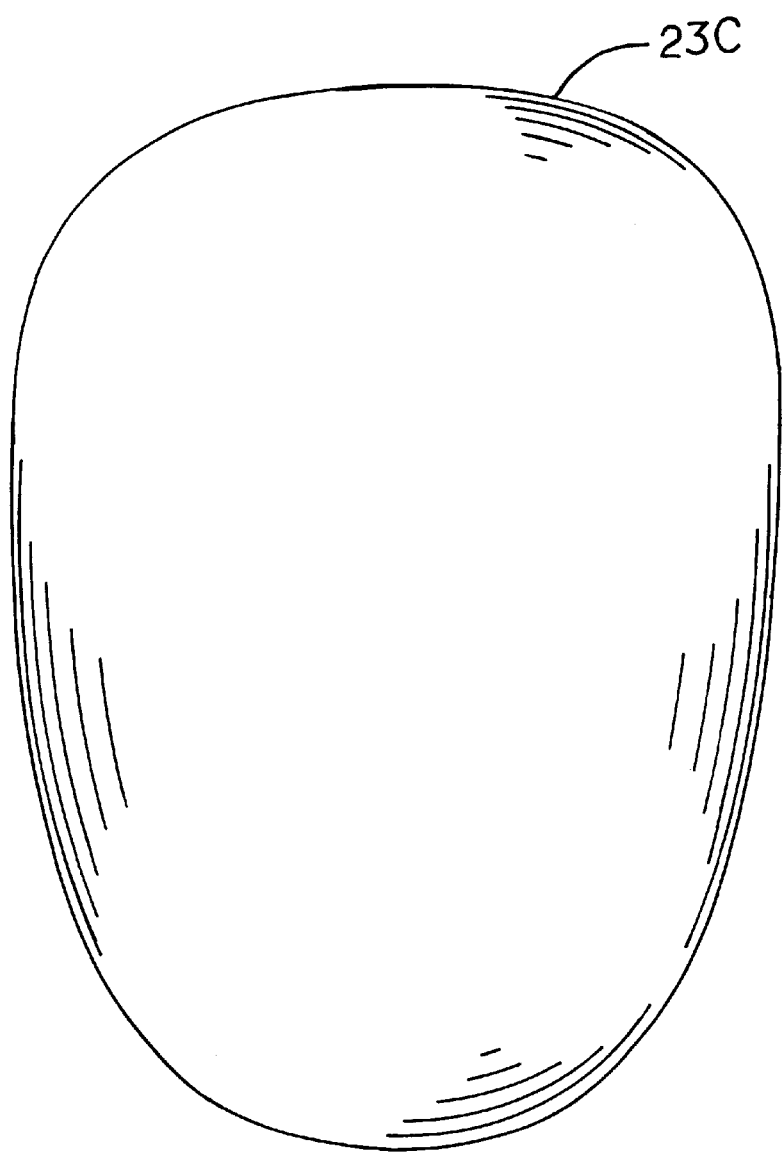
FIG. 25 is a front elevational view of an informational placard (shown blank) for use with the seat back of the present invention.

As shown in FIGS. 1, 3, 14 and 16, the seat back 22 may be provided with an indentation 23a surrounded by a ridge 23b. The indentation is sized to receive therein an informational placard 23c illustrated in FIG. 25. Also, the seat back 22 may be provided with a pair of side panels 23d.

Figure 23:
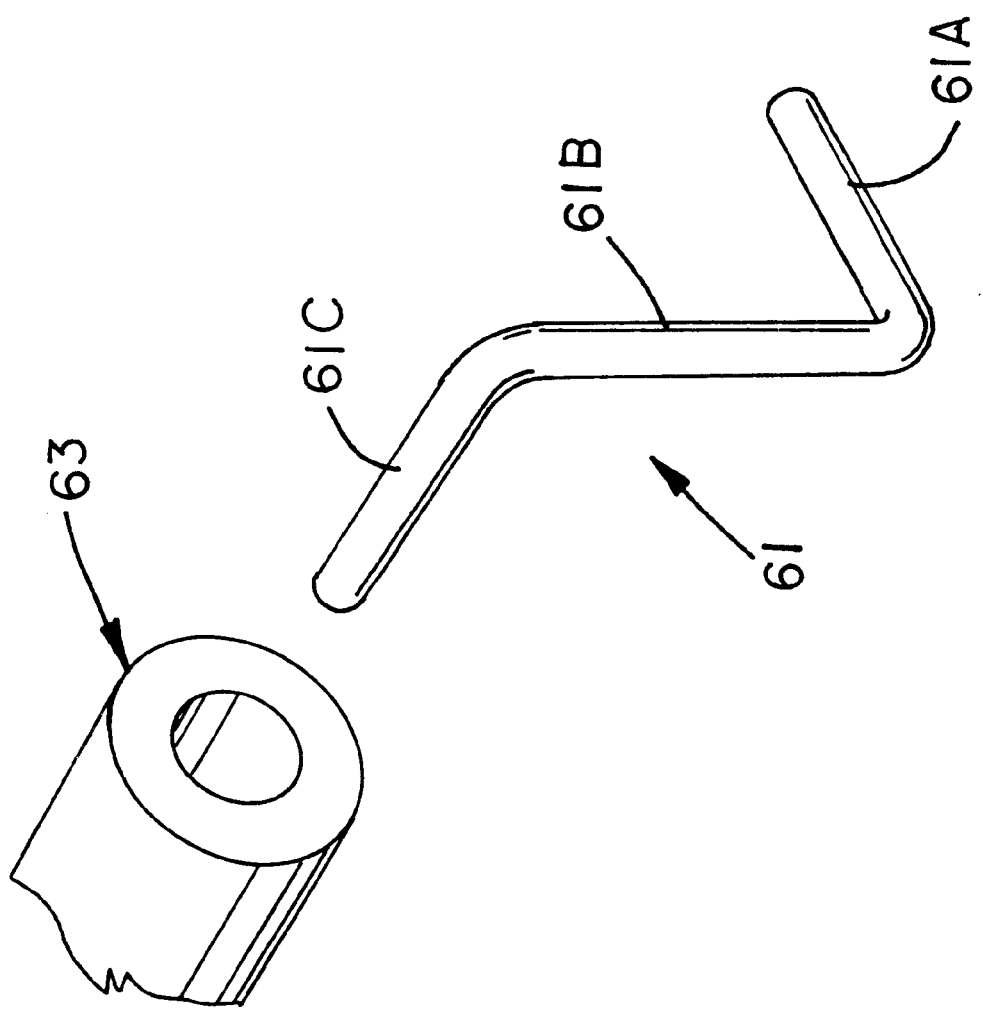
FIG. 23 is an enlarged and partially exploded view in perspective of a Z-shaped bracket for use in attaching the restraint bar to the frame.
Figure 24:
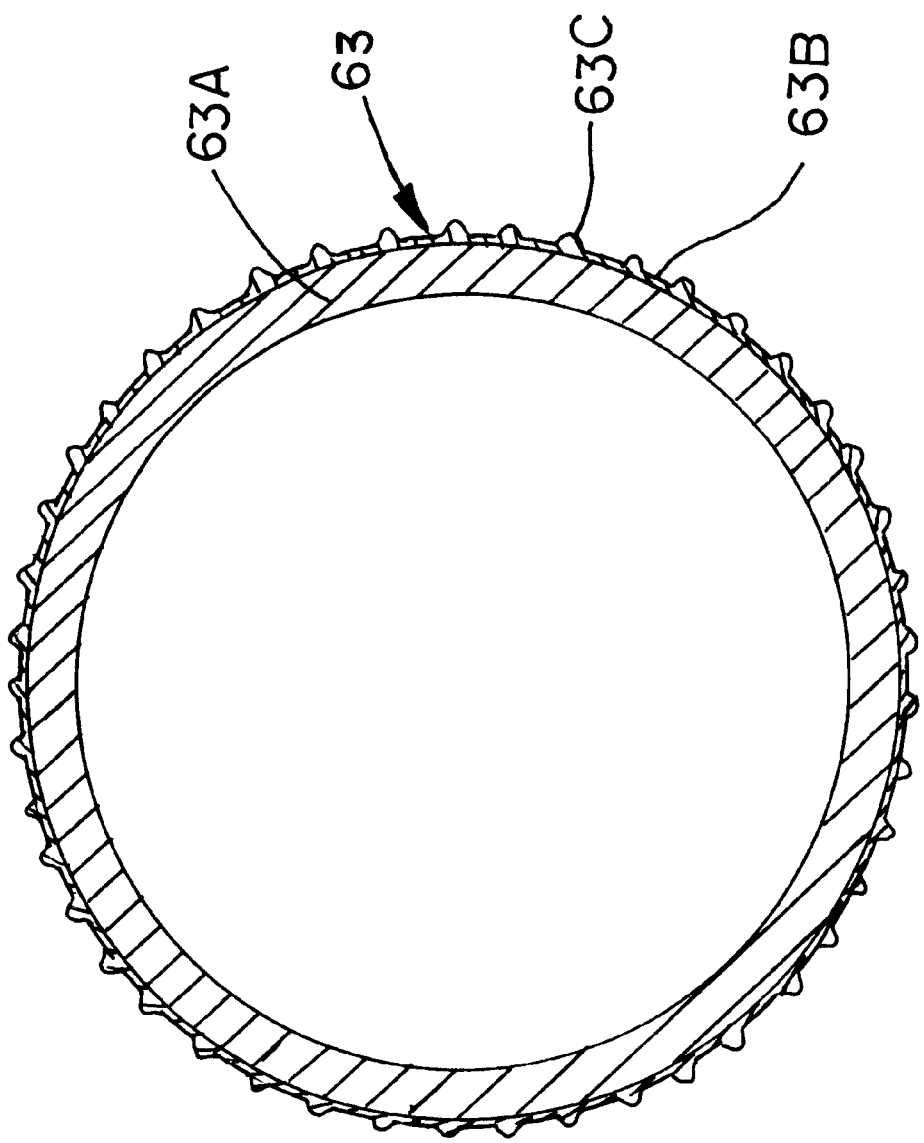
FIG. 24 is an enlarged cross-sectional view of the restraint bar.

Referring now to FIG. 23, the restraint bar 62 may be constructed from a pair of Z-shaped brackets 61, each of which includes a base leg 61a for attachment to and adjacent one of the sloping rails 50, 52, an intermediate leg 61b, and a horizontally extending leg 61c. The restraint bar 62 may further include a cross bar 63, which may be constructed as shown in FIG. 24. As shown therein, the cross bar 63 may include a relatively rigid inner section 63a surrounded by a relatively soft outer section 63b. The outer section 63b may be provided with a number of circumferentially spaced longitudinal ribs 63c.

In the preferred embodiment, and referring now to FIG. 4, the first cargo area 32 (visible in FIGS. 1 and 2) is provided with the cargo bag 64, which may be constructed of nylon mesh or other suitable flexible materials. Such nylon mesh or other suitable materials are readily available and may be easily sized to meet dimensional requirements. The cargo bag 64 includes a front wall 66, a back wall 68, interconnecting sidewalls 70, 72, and a floor 74. Preferably, one or more horizontally disposed stiffeners 75 are provided. In the embodiment shown, two such stiffeners 75 are used on the bottom wall 74, while another stiffener 75 is used along a top edge 66a of the front wall. Yet another stiffener 75 may be provided along the back wall 68 if desired. The back wall 68 includes an upper edge 68a which is provided with a plurality of grommets 68b. The number of grommets 68b will preferably correspond to the number of snaps 55 on the cross bar 54b of the handle 54. As shown in FIGS. 10–13, the snaps 55 may include a pair of posts 55a, 55b, each of which is deflectable in response to placement of one of the grommets 68b thereon. Each of the posts 55a, 55b further includes a retaining ledge 55c (best visible in FIGS. 11 and 13). The grommets 68b are sized for placement on the snaps 55 and will be retained by the ledges 55c in order to provide a secure connection. Other forms of attachment may also be contemplated. The cargo bag may also include a pair of opposing flaps 77, each of which includes a grommet 77a, in order to engage corresponding snaps on the legs of the handle 54 (not shown) to provide additional securement of the cargo bag 64. At least one of the front wall 66, the back wall 68, or the side walls 70, 72 may be provided with one or more pockets 76 which, in the embodiment shown, are disposed on the back wall 68.

The cargo bag 64 may include a pair of longitudinal loops 78, 80 which permit securement to the sloping rails 50, 52 of the frame 12. Additionally, the cargo bag 64 may include a cross panel 82 which may be secured to the handle 54 by a plurality of suitable fasteners. The upper portions 70a, 72a of the sidewalls 70, 72 may comprise side panels instead of the cross panel 82 and the loops 78, 80. Additionally, the cargo bag 64 may include a pair of hooks 64a, 64b at the lower corners of the front wall 66 to provide additional securement to the frame 12.

Figure 36:
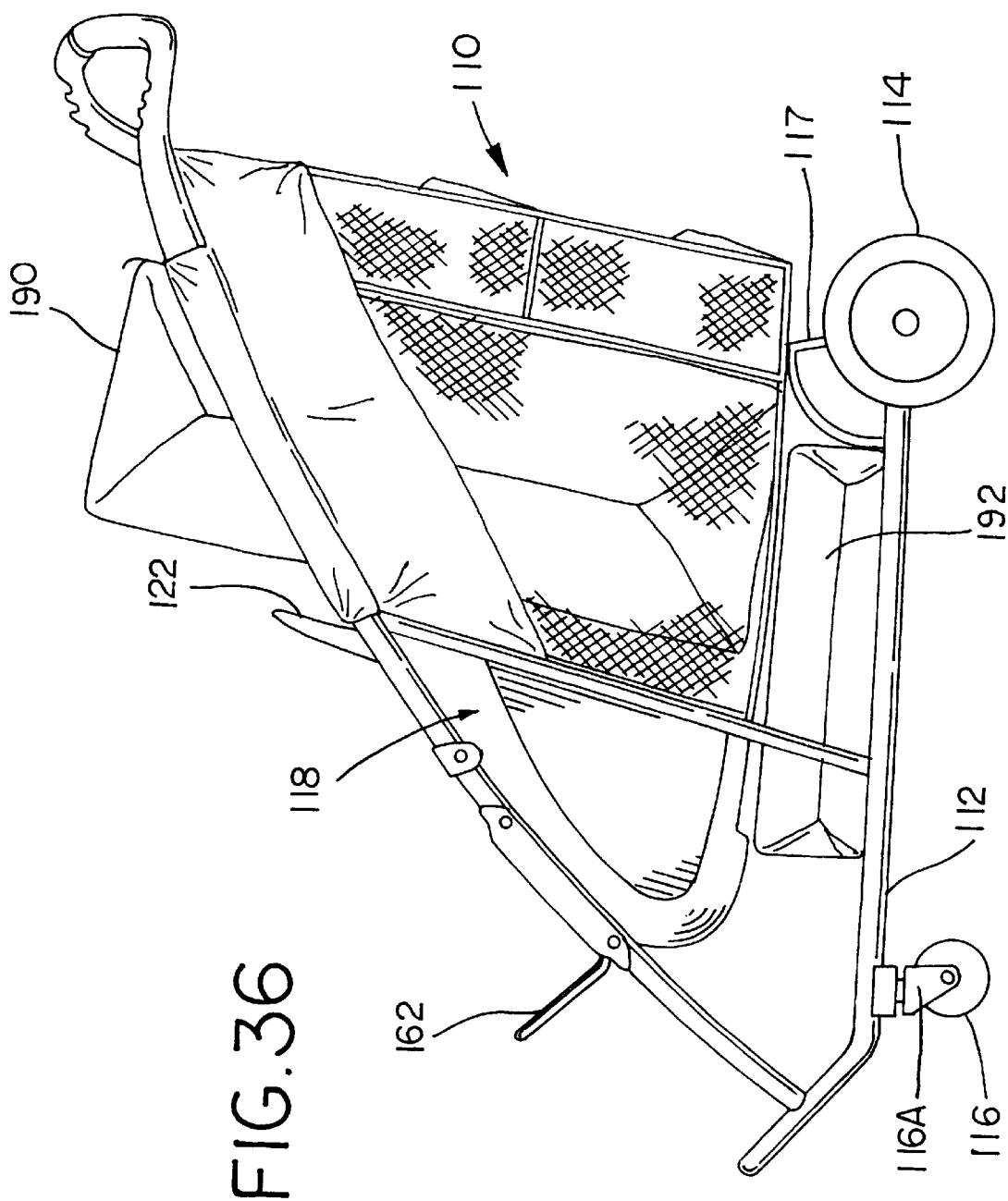
FIG. 36 is a side elevational view similar to FIG. 29 showing the seat positioned to receive a child and cargo stored in various locations.

In operation, the shopping cart 10 may be configured with the seat bottom 20 in the unfolded and generally horizontal position (in a manner similar to that shown in FIG. 27), such that a child may sit on the seat bottom 20. When so configured, one or more items (such as items similar to item 190 shown below in FIGS. 36 and 37 with respect to the second embodiment) may be stored in the cargo area 32 supported by the cargo bag 64. Further, one or more items 192 may be stored in the lower cargo area 34 supported by the floor 46. Additional items such as purses, shopping bags, or other items (not shown) may be supported on the hook 69 defined in the handle 54 (FIGS. 10 and 11).

Many times a child is not being transported in the shopping cart 10 and it may be desirable to carry additional cargo in the space otherwise occupied by the child. The seat bottom 20 of the seat 18 can be left down in the unfolded position in which packages and the like can be placed directly in the seat 18 in the cargo area 36, or the seat bottom 20 can be folded to the position of FIG. 1 such that it is disposed generally adjacent to the seat back 22 to create an expanded cargo area which can then receive an additional larger item therein (such as the item 194 shown in FIG. 37). When the seat bottom 20 of the seat 18 is folded, it will be noted that the creation of an expanded cargo area results from the continuity between the area defining the cargo area 36 and the cargo area 34 allowing useful cargo area to extend farther forward as well.

It will also be noted that the shopping cart 10 may serve the additional function of accommodating an infant seat. This additional function is explained in greater detail below with respect to the second embodiment. It will be understood, however, that the above-described first embodiment may perform this added function in a similar manner.

Referring now to FIGS. 27–37 of the drawings, a shopping cart assembled in accordance with the teachings of a second preferred embodiment of the present invention is generally referred to by the reference numeral 110. The shopping cart 110 includes a frame 112 supported on a pair of rear wheels 114 and a pair of front wheels 116, with each of the front wheels 116 being mounted on a caster 116a. The configuration shown is a four-wheeled configuration. In accordance with a preferred embodiment, wheel guards 117 may be provided generally adjacent the rear wheels 116.

A seat 118 is mounted to the frame 112. The seat 118 includes a seat bottom 120 and a generally upright seat back 122. The seat bottom 120 is mounted to a pivot 124 (visible in FIG. 28) such that the seat bottom 120 can pivot or otherwise shift between two distinct positions. In particular, the seat bottom 120 can pivot or shift between the unfolded position of FIGS. 27, 30 and 31, and the folded position of FIG. 28.

Figure 37:
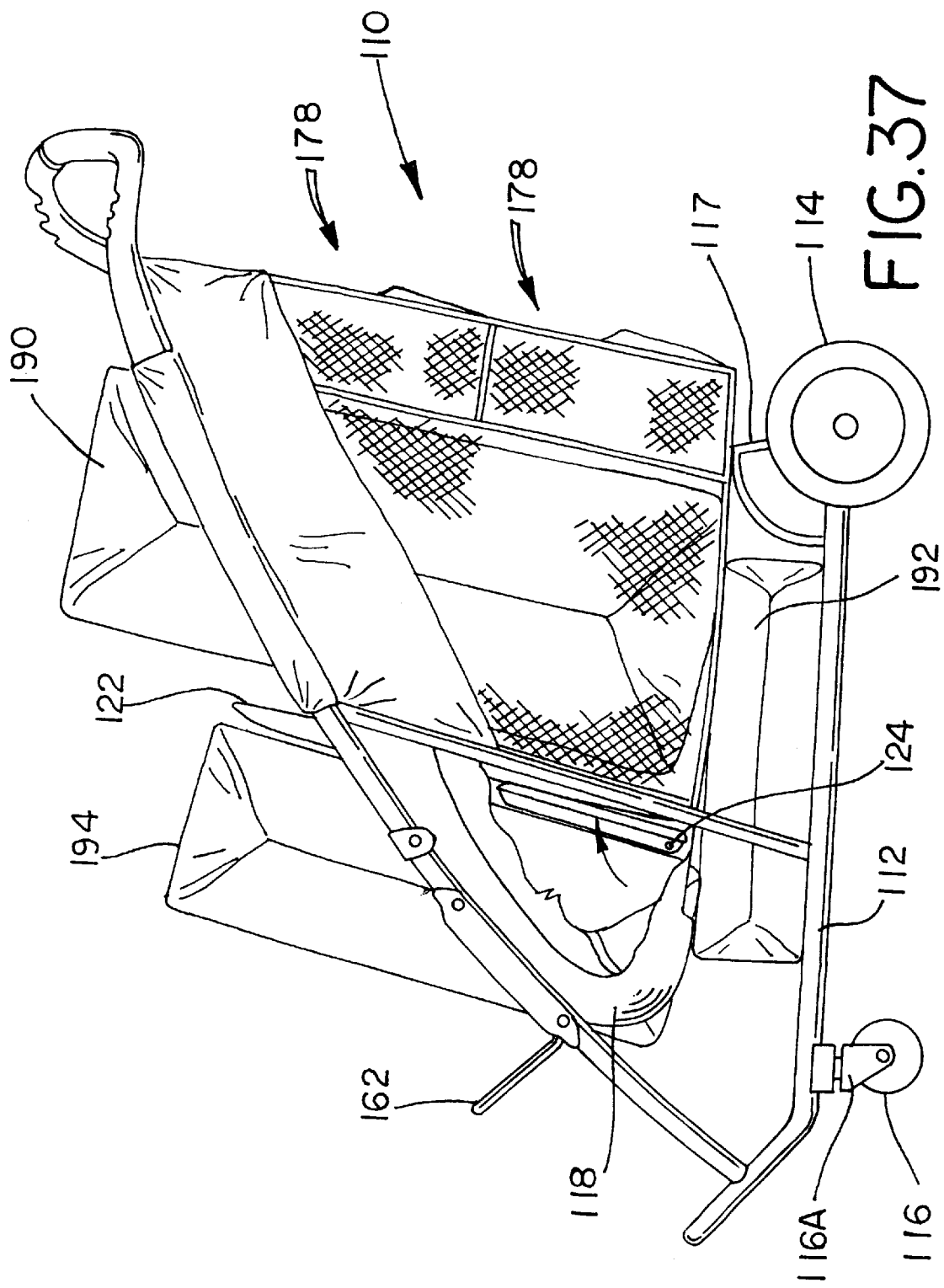
FIG. 37 is a side elevational view similar to FIG. 36 but showing the seat in a folded position with additional cargo carried by the shopping cart.

The shopping cart 110 includes a front end 126, a rear end 128, and a lower area 130. A first cargo area 132 is defined generally adjacent the rear end 128 of the shopping cart 110. A second cargo area 134 is defined generally adjacent the lower area 130. A third cargo area 136 is defined generally in the area normally occupied by the seat 118. The third cargo area 136 can be enlarged by folding the seat bottom 120 to the folded position as shown in FIG. 37.

The frame 112 includes a pair of lower rails 138, 140 which are connected by a front cross bar 142 and one or more intermediate cross bars 144. A floor 146 extends between the lower rails 138, 140 which slope upwardly toward the front end 126 of the shopping cart 110. In this manner, the cross bar 142 is slightly raised to form a portion of a footrest 148. Alternatively, the lower rails 138, 140 may extend straight out or straight up. As shown, the floor 146 is a grate. Alternatively, the floor 146 may be a solid or perforated platform, or formed of webbing or a plurality of flexible straps.

The frame 112 also includes a pair of sloping rails 150, 152 which extend generally rearwardly and upwardly to a handle 154. The handle 154 may be attached to the sloping rails 150, 152 by any suitable fasteners. Alternatively, the handle 154 may be integrally formed with the sloping rails 150, 152 of the frame 112. One or more uprights or intermediate supports 156 may be provided between the sloping rails 150, 152 and the lower rails 138, 140.

Figure 33:
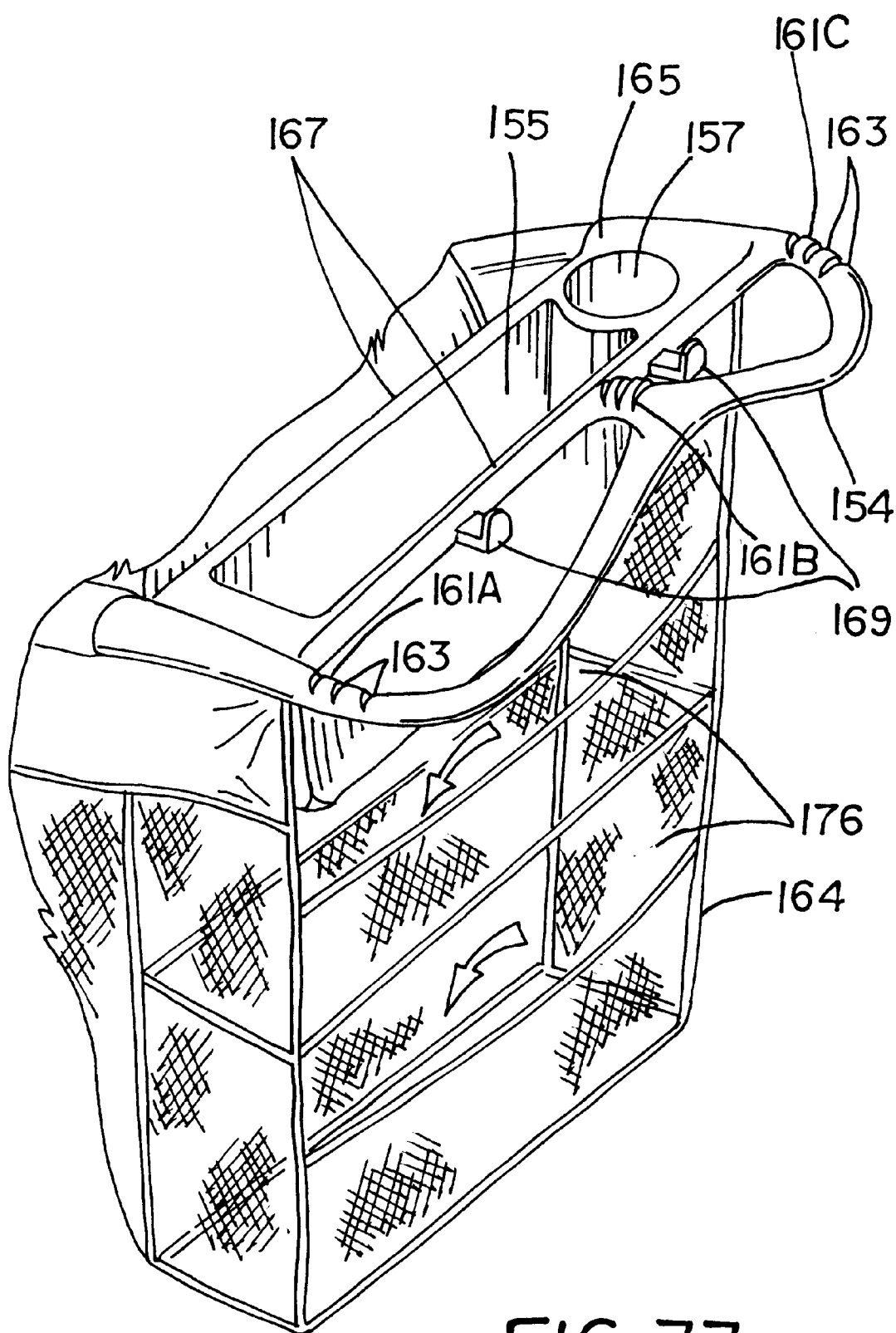
FIG. 33 is a fragmentary view in perspective illustrating the handle, the storage bin and segregated pockets in the rearward portion of the net cargo bag.

In accordance with another aspect of the invention, the handle 154 may include a storage bin 155 and/or a cupholder 157, thus providing additional cargo space. As shown in FIG. 33, the handle 154 includes a cross member 159 and three legs 161a, 161b, and 161c. One or more of the legs 161a, 161b, and 161c, and/or the cross member 159 may be provided with one or more indentations or notches 163 which are sized to receive therein a hanger such as a garment hanger (not shown) of the type commonly encountered in a retail establishment.

The storage bin 155 and the cupholder 157 may be formed from a single unit 165, such as a molded plastic unit. The unit 165 includes a pair of walls 167 which may additionally function as cross members. Additionally one or more rearwardly facing hooks 169 may be provided (FIGS. 30 and 33) on the rearmost wall 167.

In further accordance with yet another aspect of the invention, it will be noted that the seat 118 may be a separate unit which is bolted, riveted, or otherwise suitably secured to the frame 112 such as by a plurality of fasteners 158 secured to the sloping rails 150, 152. Preferably, the seat is molded or otherwise formed of polypropylene or ABS plastic or any other suitable material. The seat 118 is preferably provided with a seatbelt 160 15 which is preferably of the "T" strap design known in the art. Further, a restraint bar 162 may be provided which extends across the front of the seat generally between the sloping rails 150, 152. All or a portion of the restraint bar 162 may be covered or otherwise encapsulated in a resilient padding material, such as foam padding or other materials that would be known to those of skill in the art. It will be noted that the restraint bar 162 may perform at least one additional function, i.e., helping to support an infant seat, as will be explained in greater detail below.

In the preferred embodiment, the cargo area 132 is provided with a net cargo bag 164, which is preferably a flexible net cargo bag constructed of, by way of example and not limitation, a nylon mesh material, which is readily available and which may be easily sized to meet dimensional requirements. The cargo bag 164 includes a front wall 166 (obscured by the seat back 122 in FIG. 27), a back wall 168, interconnecting sidewalls 170, 172, and a floor 174. At least one of the front wall 166, the back wall 168, or the sidewalls 170, 172 may be provided with one or more pockets 176. In the embodiment shown, the pockets 176 are disposed on the back wall 168.

The cargo bag 164 may include a pair of longitudinal loops 178, 180 which permit securement to the sloping rails 150, 152 of the frame.

Additionally, the cargo bag 164 may include a cross panel 182 which may be secured to the wall 167 of the storage unit 165 by a plurality of suitable fasteners 184.

Figure 27:
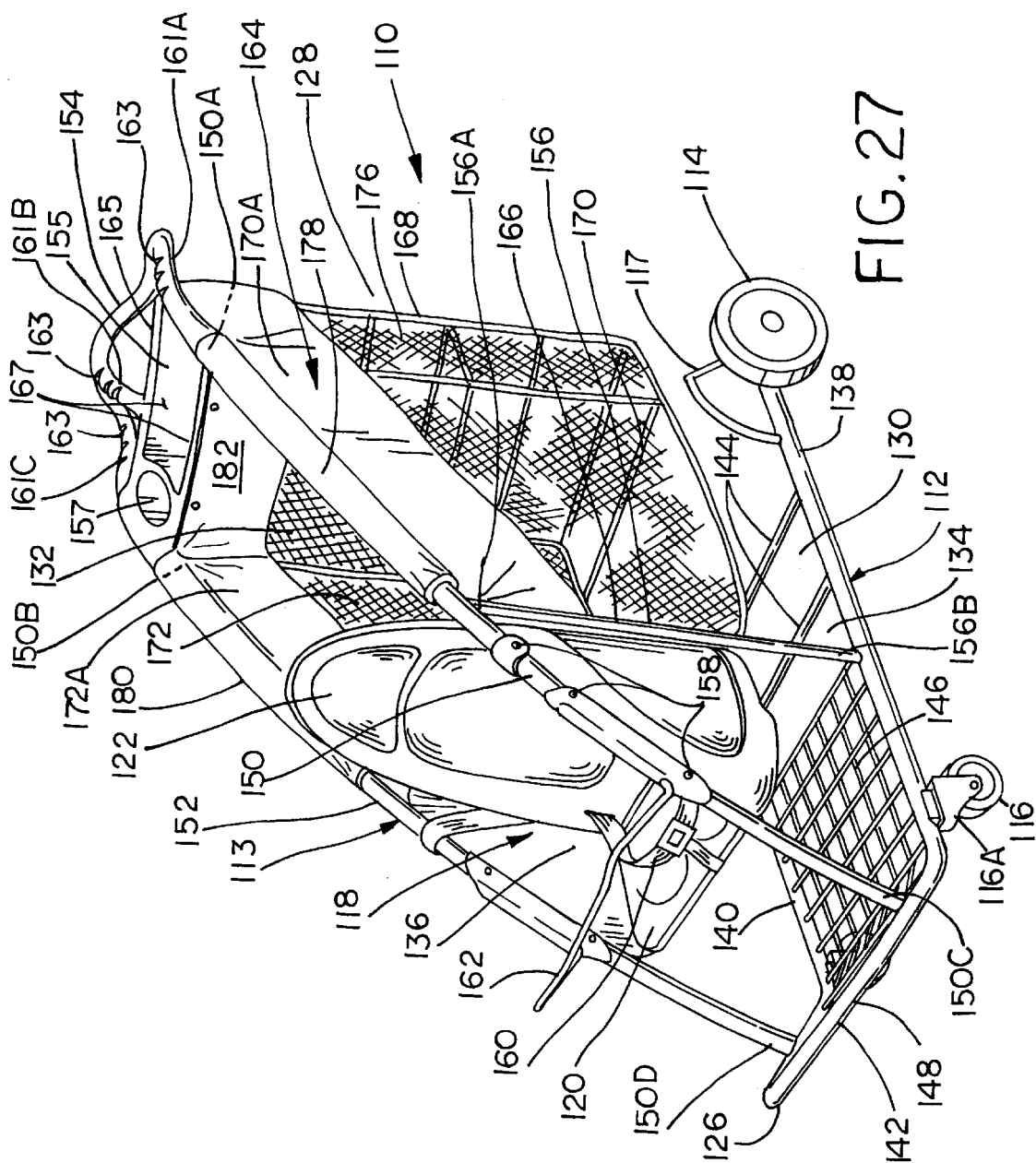
FIG. 27 is a perspective view of a shopping cart assembled in accordance with the teachings of a second preferred embodiment of the present invention and illustrating the seat in an unfolded and passenger carrying position.
Figure 28:
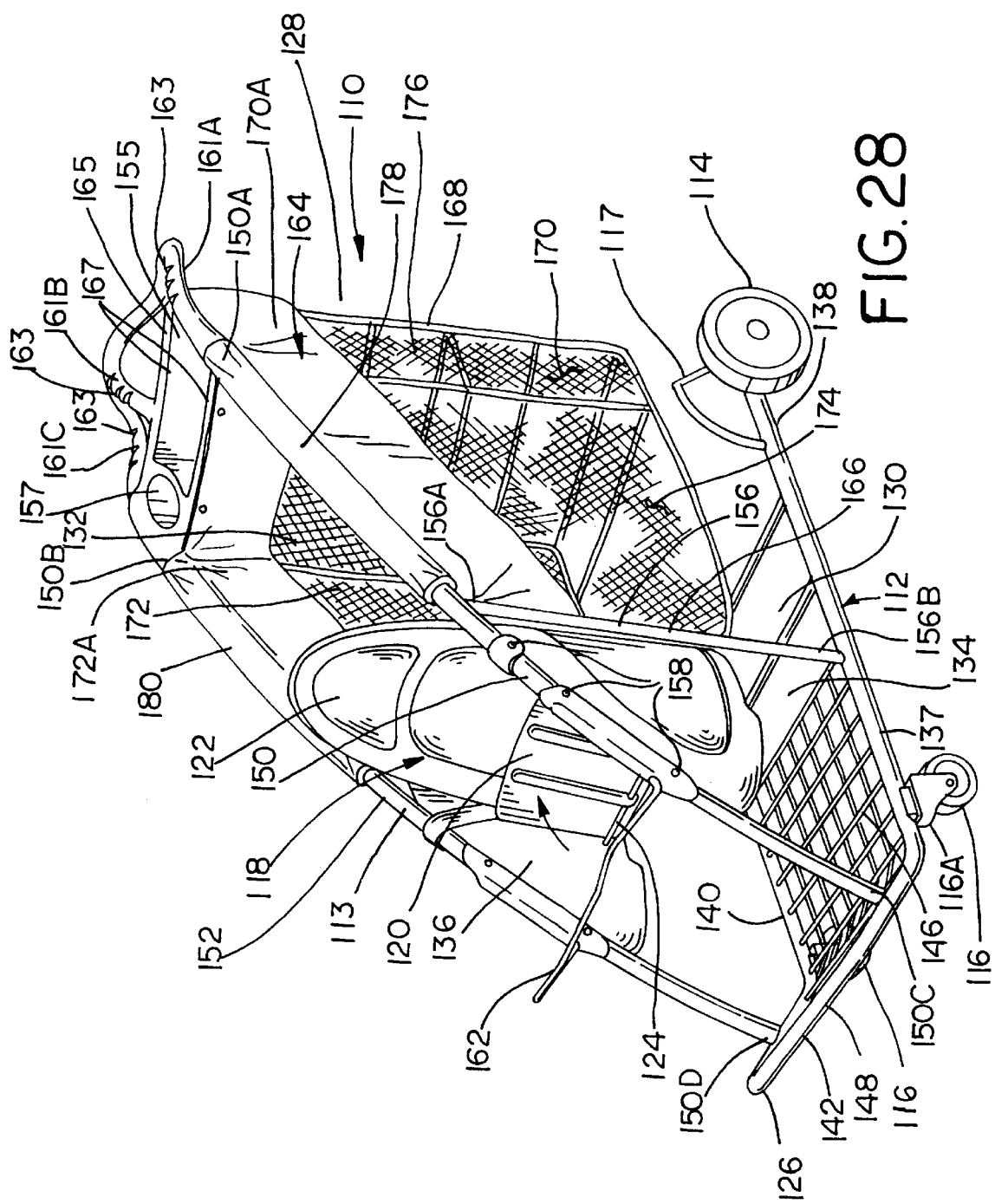
FIG. 28 is a perspective view similar to FIG. 27 but illustrating the seat in a folded position.
Figure 29:
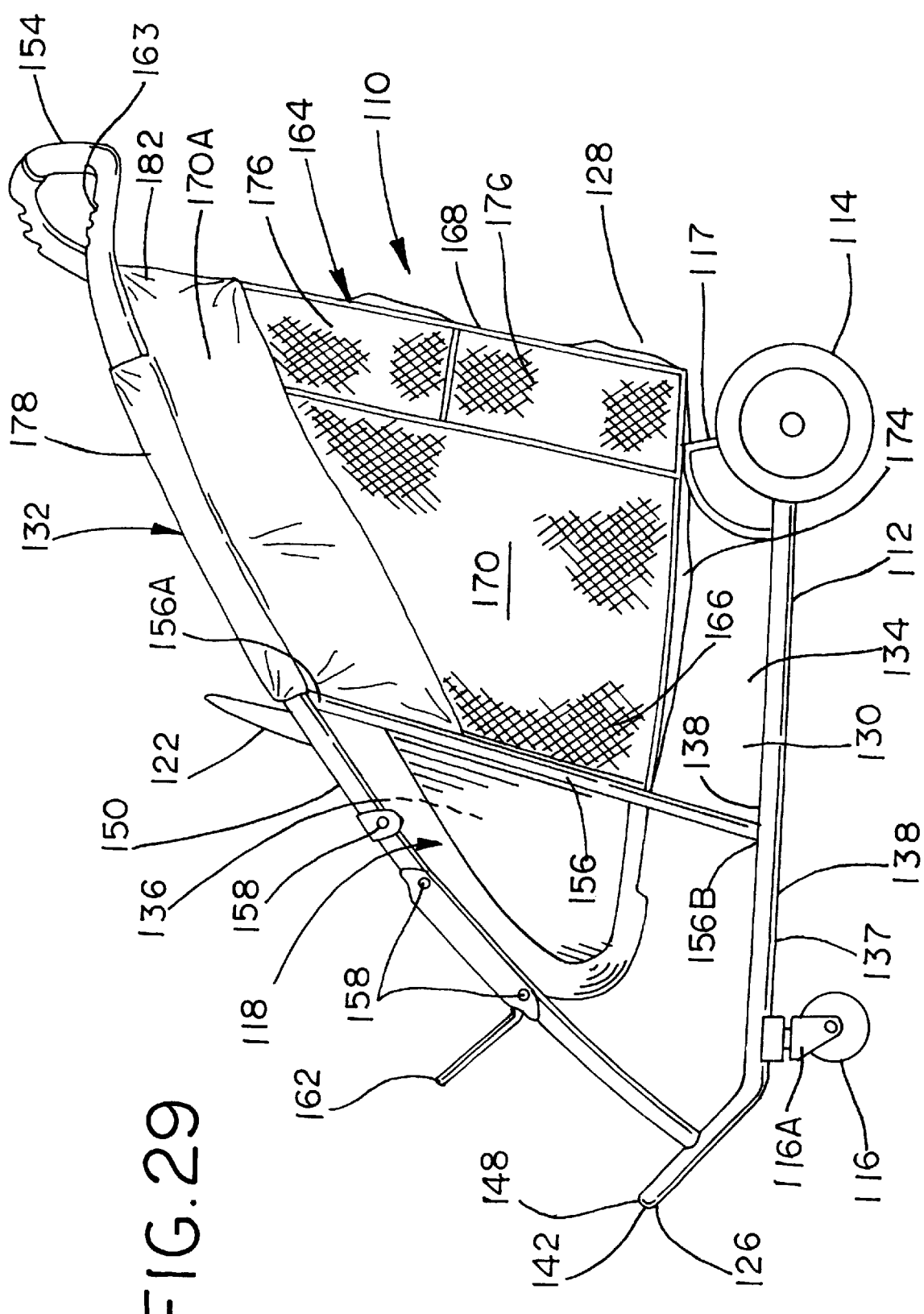
FIG. 29 is a side elevational view of the shopping cart illustrated in FIGS. 27 and 28.

In operation, the shopping cart 110 may be configured as shown in FIG. 27 such that a child may sit on the seat bottom 120. When so configured, one or more items (such as the items similar to the items 190 shown below in FIGS. 36 and 37 with respect to the second embodiment) may be stored in the cargo area 132 supported by the cargo bag 164. Further, one or more items 192 may be stored in the lower cargo area 134 supported by the floor 146. Additional items (not shown) may be stored in the storage unit 165, such as in the bin 155 or in the cupholder 157. Still further, one or more hanger supported items, purses, shopping bags, or other items (not shown) may be supported on the notches 163 defined in the handle 154 or on the hooks 169 (FIG. 33).

Many times a child is not being transported in the shopping cart 110 and it may be desirable to carry additional cargo in the space otherwise occupied by the child. The seat bottom 120 of the seat 118 can be left down in the unfolded position in which packages and the like can be placed directly in the seat 118 in the cargo area 136, or the seat bottom 120 can be folded to the position of FIGS. 28 and 37 such that it is disposed generally adjacent to the seat back 122 to create an expanded cargo area which can then receive an additional larger item 194 therein. When the seat bottom 120 of the seat 118 is folded, it will be noted that the creation of the expanded cargo area results from the continuity between the area defining the cargo area 136 and the cargo area 134 allowing useful cargo area to extend farther forward as well.

Figure 34:
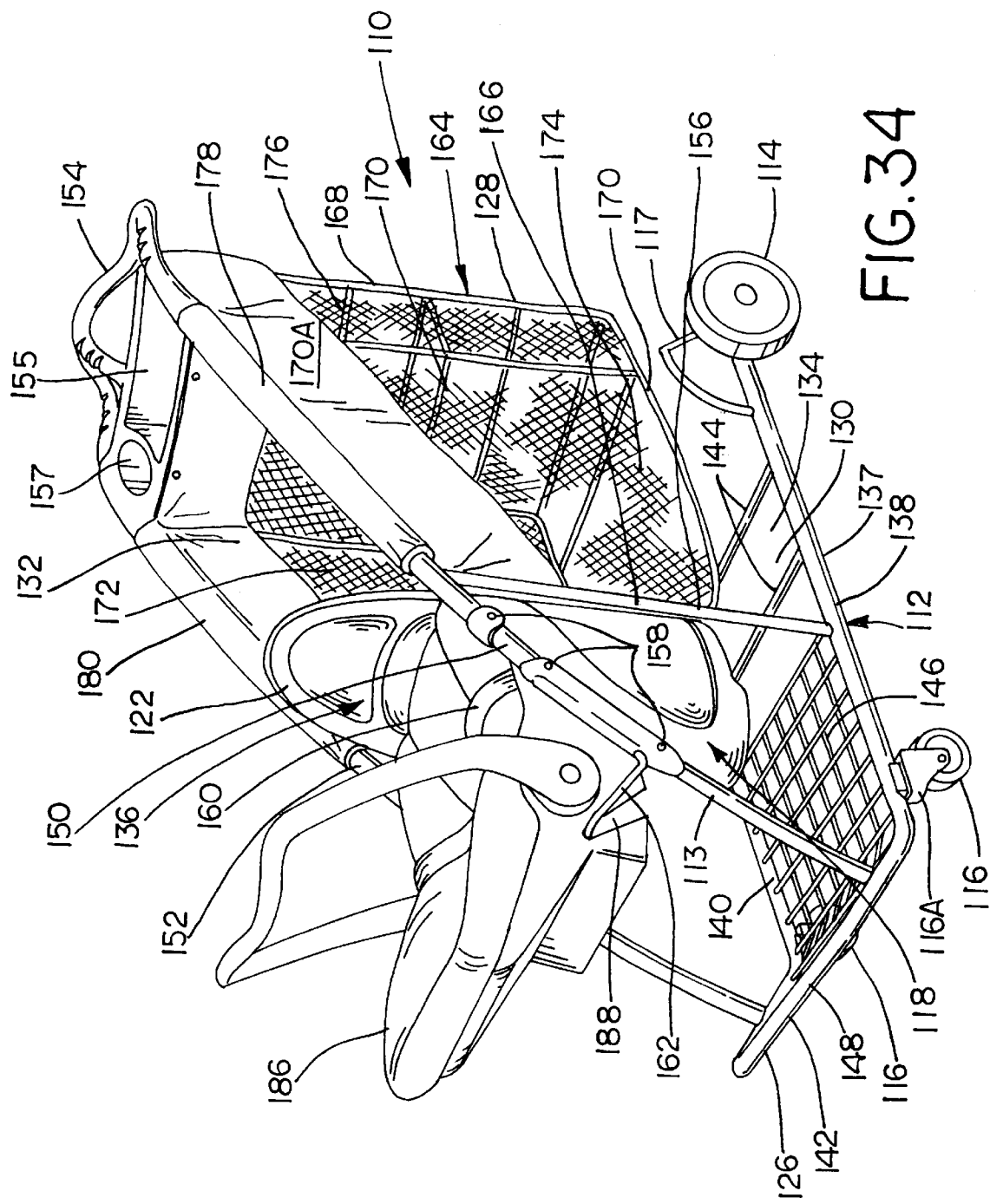
FIG. 34 is a perspective view similar to FIG. 27 but showing an infant seat supported by the shopping cart.
Figure 35:
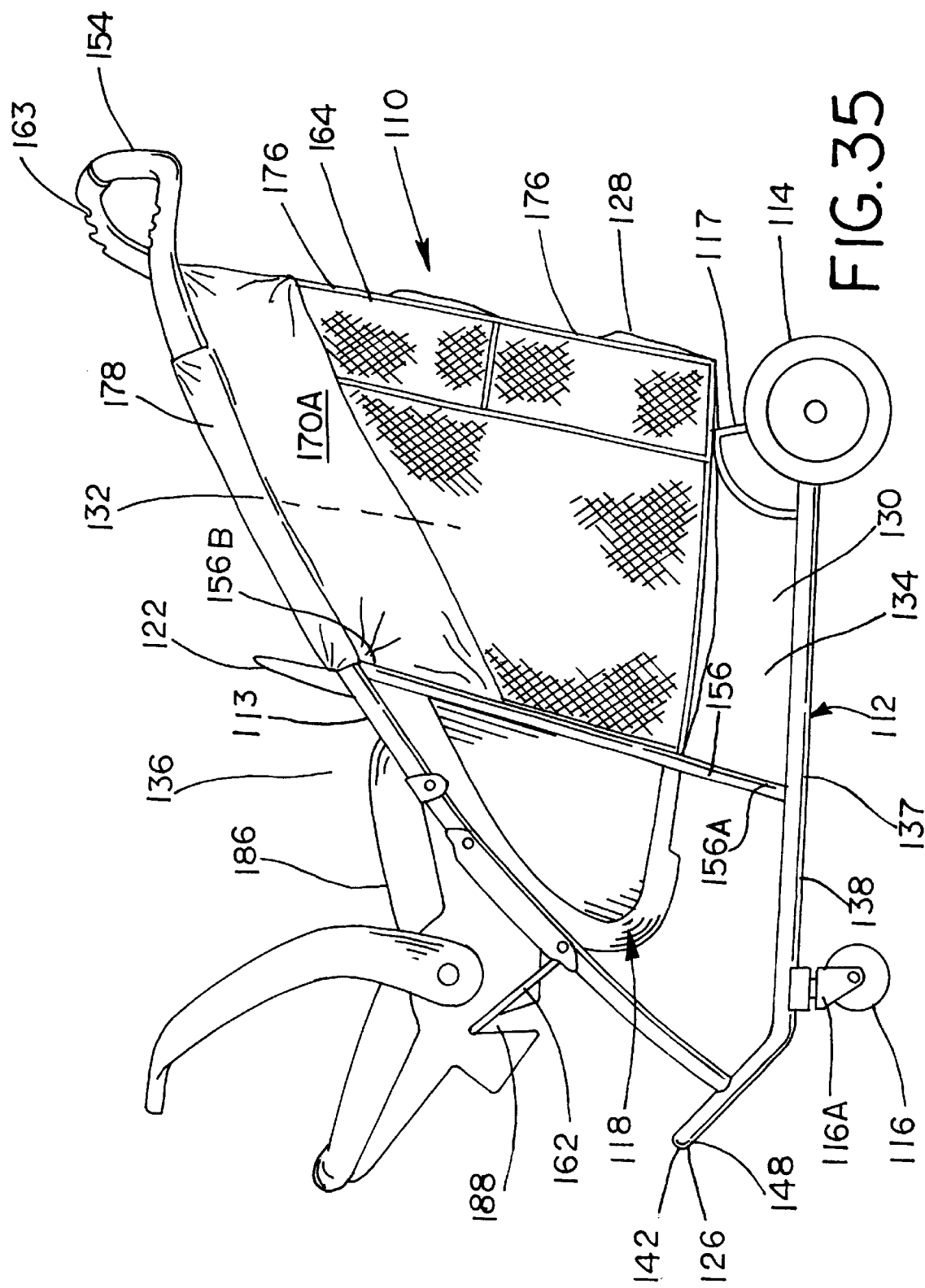
FIG. 35 is a side elevational view of the shopping cart illustrated in FIG. 34.

Referring now to FIGS. 34 and 35, it will be noted that the shopping cart 110 may function to receive a commercially available infant seat 186. In the embodiment shown, the shopping cart 110 is arranged so that the infant seat 186 is supported generally within the seat 118 and the restraint bar 162 is sized and positioned to engage a slot 188 which is normally provided in commercially available infant seats. As will also be appreciated, the seat belt 160 for the seat 118 serves to further secure the infant seat 186 in place generally within the seat 118 in the shopping cart 110.

Figure 38:
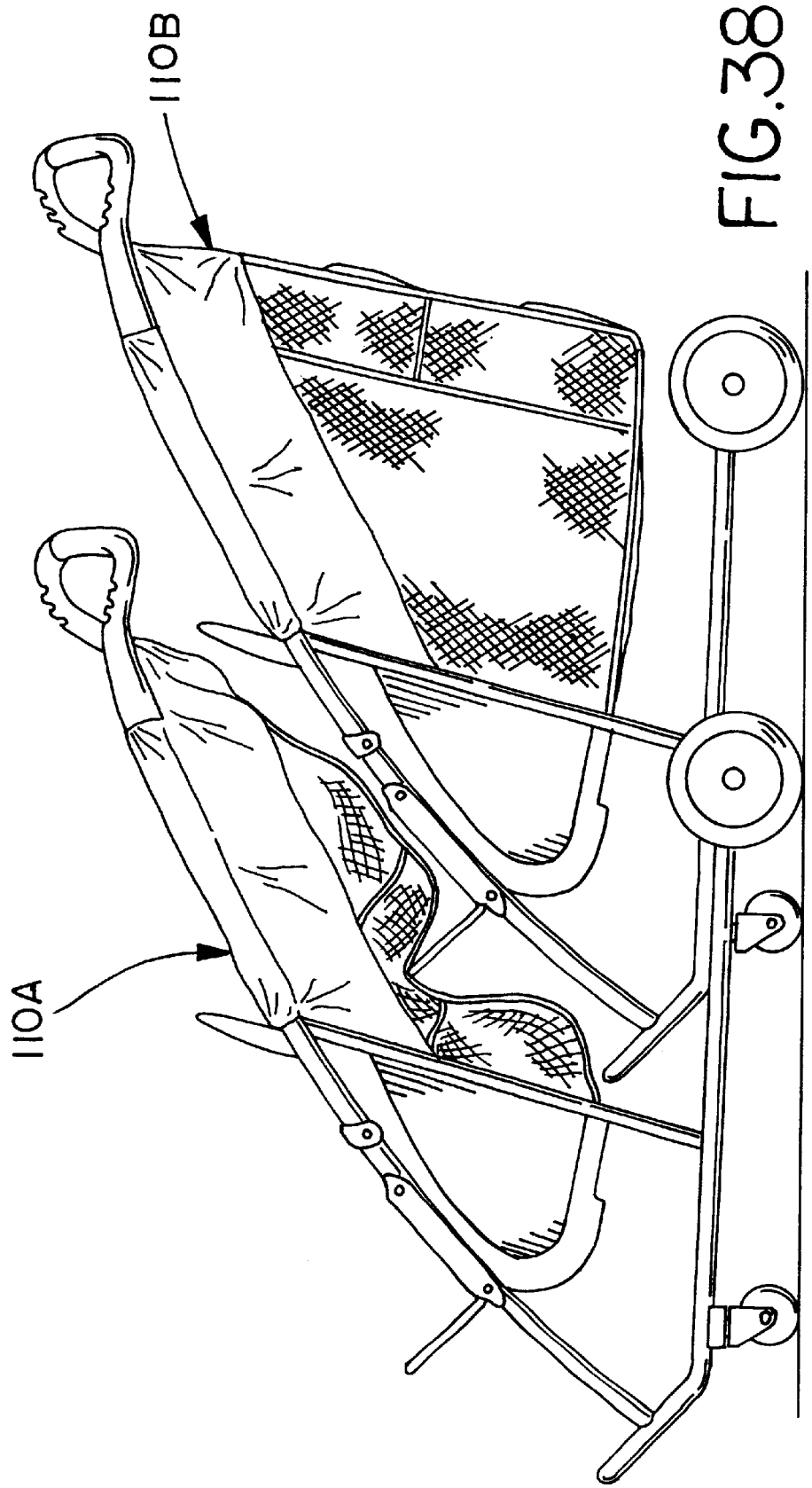
FIG. 38 is a side elevational view of two shopping carts assembled in accordance with the teachings of the present invention which are illustrated in a nested arrangement.

Referring now to FIG. 38, it will be noted that because of space considerations it is often desirable to store unused shopping carts in a nested arrangement. The front end of one cart generally nests within a space defined in the rear end of another similar shopping cart. Accordingly, the rear wheels 116 and the lower rails 138, 140 on the shopping cart 110A shown to the left of FIG. 38 are sized and spaced to receive the front end of a similar shopping cart (here designated as shopping cart 110B). Thus the shopping carts 110A and 110B may be stored in the desired nested arrangement. As will be noted, the cargo bag 164 on the shopping cart 110A does not interfere with this nested arrangement, as the cargo bag 164 simply folds out of the way.

Figure 39:
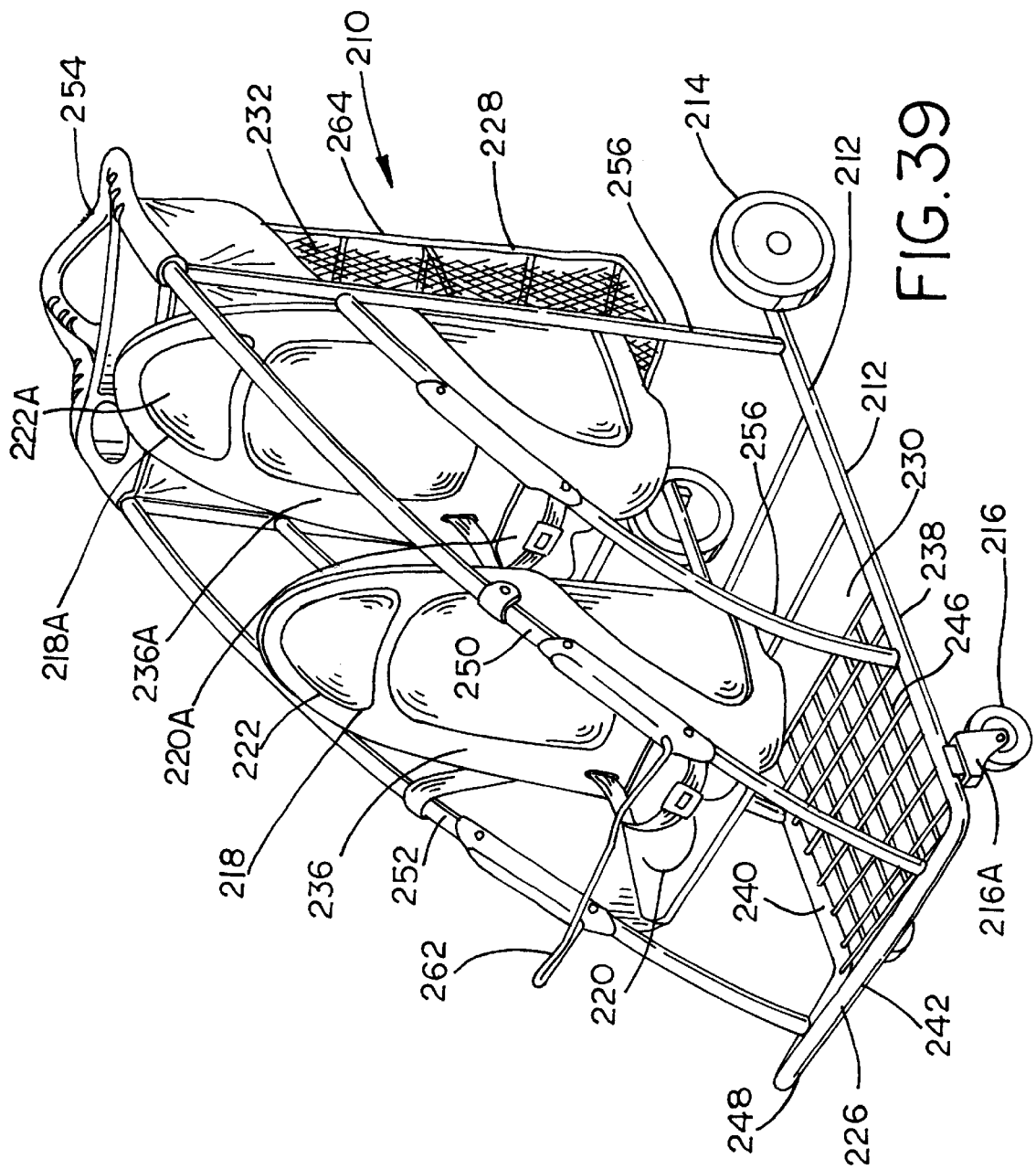
FIG. 39 is a perspective view of a shopping cart assembled in accordance with the teachings of a third preferred embodiment of the present invention.
Figure 40:
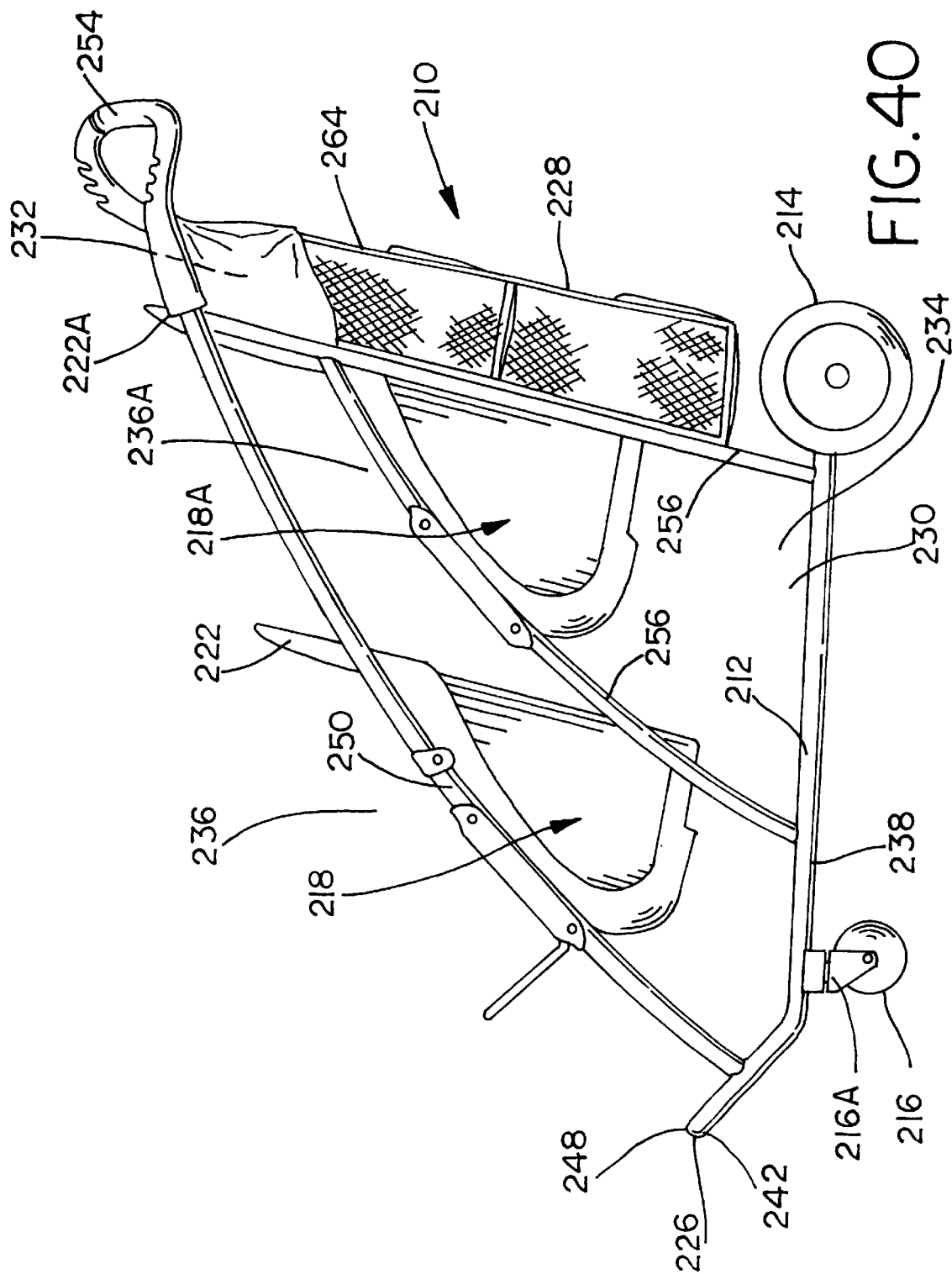
FIG. 40 is a side elevational-view of the shopping cart illustrated in FIG. 39.

Referring now to FIGS. 39 and 40, a shopping cart assembled in accordance with a third preferred embodiment of the present invention is generally referred to by the reference numeral 210. It will be understood that each of the elements of the shopping cart 210 that are the same or similar to the shopping cart 10 discussed above will retain the same reference numerals, albeit increased by 200. The shopping cart 210 includes a frame 212 supported on a pair of rear wheels 214 which may be provided with wheel guards and a pair of front wheels 216, with each of the front wheels being supported on casters 216a. A pair of seats 218 and 218a are mounted to the frame 212, wherein the seat 218 includes a seat bottom 220 and a generally upright seat back 222, while the seat 218a includes a seat bottom 220a and a seat back 222a. It will be seen that the seat bottoms 220 and 220a are mounted to suitable pivots such that the seat bottoms 220 and 220a each can pivot or otherwise shift between unfolded and folded positions. In this connection, the manner of pivoting or shifting the seat bottoms 220 and 220a is similar to that described above with respect to the first and second preferred embodiments and, as before, a restraint bar 262 can be provided in front of the seat 218.

The shopping cart 210 includes a front end 226, a rear end 228, and a lower area 230. A first cargo area 232 is defined generally adjacent the rear end 228 of the shopping cart 210, and a second cargo area 234 is defined generally adjacent the lower area 230. The shopping cart 210 may also include a first additional cargo area 236 formed in the area normally occupied by the seat 218. The first additional cargo area 236 is formed by folding the seat bottom 220 to the folded position as described above. Similarly, a second additional cargo area 236a may be formed in the area normally occupied by the seat 218a by folding the seat bottom 220a to the folded position as described above. The shopping cart 210 will preferably include a flexible net cargo bag 264 in the cargo area 232.

The frame 212 includes a pair of lower rails 238, 240 which are connected by a front cross bar 242 and one or more intermediate cross bars 244. A floor 246 extends between the lower rails 238, 240. The lower rails 238, 240 slope upwardly toward the front end 226 of the shopping cart 210 such that the cross bar 242 is slightly raised to form a portion of a footrest 248.

The frame 212 also includes a pair of sloping rails 250, 252 which extend generally rearwardly and upwardly to a handle 254. The handle 254 may be attached to the sloping rails 250, 252 by any suitable fasteners. Alternatively, the handle 254 may be integrally formed with the sloping rails 250, 252 of the frame 212. One or more uprights or intermediate supports 256 may be provided between the sloping rails 250, 252 and the lower rails 238, 240.

Equipped with two seats 218 and 218a, the shopping cart 210 may carry two children (not shown) and at least one of the children may be secured to the shopping cart 210 in an infant seat in the manner described above with respect to the second preferred embodiment (as shown in FIG. 34).

Although certain exemplary embodiments constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed:

1. A combined shopping cart stroller having cargo carrying and passenger carrying capabilities, comprising:

a frame supported on wheels for rolling movement including: (i) an at least primarily horizontal lower frame portion having a forward end, a rearward end, and a pair of rails in spaced relation, (ii) a curved upper frame portion extending from a point at or near the forward end of the lower frame portion to a point spaced above the rearward end of the lower frame portion, the upper frame portion having a pair of rails in spaced relation, and (iii) a pair of generally vertical supports extending between the respective rails of the lower frame portion and the upper frame portion;

the generally vertical supports extending from a point generally intermediate the forward and rearward ends of the lower frame portion to a corresponding point of the upper frame portion generally above the lower frame portion;

a seat mounted to the frame to provide a seating area for a passenger generally forward of the generally vertical supports; and a primary cargo area defined in the space generally bounded by the lower frame portion and the upper frame portion rearwardly of the seating area and the generally vertical supports.

2. The shopping cart stroller of claim 1, wherein the seat includes a pair of side panels, and further wherein the seat side panels are disposed between the generally vertical supports and the upper frame portion forward of the generally vertical supports to provide an enclosed seating area to protect a passenger seated therein.

3. The shopping cart stroller of claim 1, wherein the primary cargo area includes a cargo bag supported by the curved upper frame portion rearwardly of the generally vertical supports and rearwardly of the seating area.

4. The shopping cart stroller of claim 3, wherein the cargo bag includes at least one horizontally disposed cargo bag stiffener.

5. The shopping cart stroller of claim 1, including a handle disposed at a rearward most end of the curved upper frame portion, and wherein the rearward most end of the curved upper frame portion is generally vertically above a rearward end of the lower frame portion.

6. The shopping cart stroller of claim 1, including a handle rearwardly of the seating area, and wherein the primary cargo area includes a cargo bag supported on the curved upper frame portion between the generally vertical supports and the handle.

7. The shopping cart stroller of claim 1, including at least a pair of cross supports between the rails of the lower frame portion to maintain spacing between the rails and to define a secondary cargo area rearwardly of the generally vertical supports.

8. The shopping cart stroller of claim 7, the spaced rails of the lower frame portion being tapered from the rearward end to the forward end and the cross supports being spaced forwardly of the rearward end of the lower frame portion to accommodate nesting.

9. The shopping cart stroller of claim 1, including a floor area at the forward end of the lower frame portion for providing a footrest for a passenger in the seating area or an additional cargo carrying area.

10. The shopping cart stroller of claim 1, wherein the seat defines a tertiary cargo area, the seat being foldable to expand that tertiary cargo area such that it extends to the lower frame portion.

* * * * *